US010659325B2

(12) United States Patent
Dam et al.

(10) Patent No.: US 10,659,325 B2
(45) Date of Patent: May 19, 2020

(54) MONITORING ENTERPRISE NETWORKS WITH ENDPOINT AGENTS

(71) Applicant: ThousandEyes, Inc., San Francisco, CA (US)

(72) Inventors: Martin Dam, Aarhus (DK); Michael Meisel, San Francisco, CA (US); Nelson Rodrigues, London (GB); Ricardo V. Oliveira, San Francisco, CA (US); Santiago Alessandri, San Francisco, CA (US)

(73) Assignee: ThousandEyes, Inc., San Francisco, CA (US)

( * ) Notice: Subject to any disclaimer, the term of this patent is extended or adjusted under 35 U.S.C. 154(b) by 243 days.

(21) Appl. No.: 15/622,535

(22) Filed: Jun. 14, 2017

(65) Prior Publication Data

US 2017/0366421 A1 Dec. 21, 2017

Related U.S. Application Data

(60) Provisional application No. 62/350,632, filed on Jun. 15, 2016.

(51) Int. Cl.
*G06F 15/173* (2006.01)
*H04L 12/26* (2006.01)
(Continued)

(52) U.S. Cl.
CPC .......... *H04L 43/045* (2013.01); *H04L 41/046* (2013.01); *H04L 41/22* (2013.01);
(Continued)

(58) Field of Classification Search
CPC . H04L 43/08; H04L 41/5035; H04L 41/5009; H04L 43/04; H04L 41/0631; H04L 43/045; H04W 24/00; H04W 24/10
(Continued)

(56) References Cited

U.S. PATENT DOCUMENTS 5,655,081 A   8/1997   Bonnell
5,881,237 A   3/1999   Schwaller
(Continued)

FOREIGN PATENT DOCUMENTS

CN   100388695       11/2006
EP     2222025 A1    8/2010
(Continued)

OTHER PUBLICATIONS

Author Unknown, BGPlay @ Route Views, Apr. 14, 2015 retrieved from https://web.archive.org/ web/20150414123115/http://bgplay.routeviews.org/main.html.
(Continued)

*Primary Examiner* — Liang Che A Wang
(74) *Attorney, Agent, or Firm* — Van Pelt, Yi & James LLP

(57) ABSTRACT

Techniques for monitoring enterprise networks with endpoint agents are disclosed. In some embodiments, a system, process, and/or computer program product for monitoring enterprise networks with endpoint agents includes deploying a plurality of endpoint agents to a plurality of endpoint devices; collecting test results from each of the plurality of endpoint agents, wherein the test results are based on tests executed on each of the plurality of endpoint devices for monitoring network activity; and generating a graphical visualization of an application delivery state for one or more application delivery layers based on the test results, generating an alert based on the test results, or generating a report based on the test results.

28 Claims, 15 Drawing Sheets

(51) Int. Cl.
*H04L 12/24* (2006.01)
*G06F 8/60* (2018.01)
*H04L 29/08* (2006.01)

(52) U.S. Cl.
CPC .............. *H04L 43/06* (2013.01); *H04L 43/12* (2013.01); *H04L 43/50* (2013.01); *G06F 8/60* (2013.01); *H04L 67/10* (2013.01)

(58) Field of Classification Search
USPC ................................ 709/201, 202, 223, 224
See application file for complete search history.

(56) References Cited

U.S. PATENT DOCUMENTS

| | | | |
|---|---|---|---|
| 5,940,376 | A | 8/1999 | Yanacek |
| 6,397,359 | B1 | 5/2002 | Chandra |
| 6,611,955 | B1 | 8/2003 | Logean |
| 6,625,648 | B1 | 9/2003 | Schwaller |
| 6,744,739 | B2 | 6/2004 | Martin |
| 6,892,227 | B1 | 5/2005 | Elwell |
| 6,993,686 | B1* | 1/2006 | Groenendaal ....... G06F 11/2023 709/224 |
| 7,209,963 | B2 | 4/2007 | Burton |
| 7,231,555 | B2 | 6/2007 | Barnard |
| 7,240,325 | B2* | 7/2007 | Keller ................... G06F 9/5061 717/104 |
| 7,299,277 | B1 | 11/2007 | Moran |
| 7,423,979 | B2 | 9/2008 | Martin |
| 7,487,240 | B2 | 2/2009 | Proulx |
| 7,529,192 | B2 | 5/2009 | Labovitz |
| 7,616,579 | B2 | 11/2009 | Pittelli |
| 7,636,305 | B1 | 12/2009 | Taylor |
| 7,660,290 | B2 | 2/2010 | Nagami |
| 7,698,396 | B2 | 4/2010 | Aoyagi |
| 7,804,781 | B2 | 9/2010 | Xu |
| 7,822,837 | B1 | 10/2010 | Urban |
| 7,860,016 | B1 | 12/2010 | Vijendra |
| 7,894,461 | B2 | 2/2011 | Pei |
| 7,945,658 | B1 | 5/2011 | Nucci |
| 7,975,045 | B2 | 7/2011 | Underwood |
| 7,990,892 | B2 | 8/2011 | Boucadair |
| 8,015,139 | B2 | 9/2011 | Bahl |
| 8,130,767 | B2 | 3/2012 | Aitken |
| 8,161,152 | B2 | 4/2012 | Ogielski |
| 8,170,552 | B2 | 5/2012 | Patel |
| 8,185,619 | B1 | 5/2012 | Maiocco |
| 8,208,377 | B2 | 6/2012 | Subramanian |
| 8,214,876 | B2 | 7/2012 | Vaidyanathan |
| 8,228,815 | B2 | 7/2012 | Keromytis |
| 8,254,273 | B2 | 8/2012 | Kaminsky |
| 8,325,720 | B2 | 12/2012 | Gao |
| 8,438,427 | B2 | 5/2013 | Beck |
| 8,458,301 | B1* | 6/2013 | Andrus .............. H04L 41/0816 709/220 |
| 8,484,374 | B2 | 7/2013 | Zisapel |
| 8,490,055 | B2 | 7/2013 | Basak |
| 8,521,904 | B1 | 8/2013 | Pei |
| 8,542,612 | B1 | 9/2013 | Uttaro |
| 8,549,124 | B2 | 10/2013 | Duggan |
| 8,549,405 | B2 | 10/2013 | Bugenhagen |
| 8,572,281 | B1 | 10/2013 | Jesuraj |
| 8,751,619 | B2 | 6/2014 | Tychon |
| 8,971,323 | B2 | 3/2015 | Mithyantha |
| 9,014,012 | B2 | 4/2015 | Jeyachandran |
| 9,411,787 | B1 | 8/2016 | Lad |
| 10,042,958 | B2 | 8/2018 | Bekas |
| 2002/0120727 | A1 | 8/2002 | Curley |
| 2002/0141400 | A1 | 10/2002 | DeMartino |
| 2002/0199016 | A1 | 12/2002 | Freedman |
| 2003/0056140 | A1 | 3/2003 | Taylor |
| 2003/0174650 | A1 | 9/2003 | Shankar |
| 2003/0236844 | A1 | 12/2003 | Kaler |
| 2004/0046785 | A1* | 3/2004 | Keller ................... G06F 9/5061 715/734 |
| 2004/0221296 | A1 | 11/2004 | Ogielski |
| 2005/0036487 | A1 | 2/2005 | Srikrishna |
| 2005/0114500 | A1 | 5/2005 | Monk |
| 2005/0198269 | A1 | 9/2005 | Champagne |
| 2005/0222815 | A1 | 10/2005 | Tolly |
| 2005/0243729 | A1 | 11/2005 | Jorgenson |
| 2006/0023638 | A1 | 2/2006 | Monaco |
| 2006/0074946 | A1 | 4/2006 | Pham |
| 2006/0098586 | A1 | 5/2006 | Farrell |
| 2006/0291446 | A1 | 12/2006 | Caldwell |
| 2007/0043861 | A1* | 2/2007 | Baron ................. H04L 41/0631 709/224 |
| 2007/0162595 | A1 | 7/2007 | Samprathi |
| 2007/0250902 | A1 | 10/2007 | Vaidyanathan |
| 2008/0049777 | A1 | 2/2008 | Morrill |
| 2008/0089347 | A1 | 4/2008 | Phillipi |
| 2008/0155093 | A1 | 6/2008 | Dharmistan |
| 2008/0222068 | A1* | 9/2008 | Bahl ....................... G06N 5/043 706/46 |
| 2008/0222287 | A1 | 9/2008 | Bahl |
| 2008/0263188 | A1 | 10/2008 | Awduche |
| 2009/0055522 | A1 | 2/2009 | Shen |
| 2009/0161556 | A1 | 6/2009 | Qian |
| 2009/0204795 | A1 | 8/2009 | Nasuto |
| 2009/0276771 | A1 | 11/2009 | Nickolov |
| 2010/0002578 | A1 | 1/2010 | Fiorone |
| 2010/0080129 | A1 | 4/2010 | Strahan |
| 2010/0100627 | A1 | 4/2010 | Evans |
| 2010/0118714 | A1 | 5/2010 | Labovitz |
| 2010/0132039 | A1 | 5/2010 | Ji |
| 2011/0145434 | A1 | 6/2011 | Ringen |
| 2011/0286418 | A1 | 11/2011 | Liu |
| 2012/0017165 | A1 | 1/2012 | Gardner |
| 2012/0151041 | A1 | 6/2012 | Gerber |
| 2012/0191826 | A1 | 7/2012 | Gotesdyner |
| 2012/0207161 | A1 | 8/2012 | Uppalli |
| 2012/0239799 | A1 | 9/2012 | Wang |
| 2013/0311832 | A1* | 11/2013 | Lad ........................ H04L 41/042 714/37 |
| 2014/0029443 | A1 | 1/2014 | Bhavanam |
| 2014/0181292 | A1 | 6/2014 | Venkataswami |
| 2014/0280917 | A1 | 9/2014 | Lad |
| 2014/0282027 | A1 | 9/2014 | Gao |
| 2014/0304407 | A1 | 10/2014 | Moon |
| 2014/0344926 | A1* | 11/2014 | Cunningham ...... H04L 63/1441 726/22 |
| 2014/0351564 | A1 | 11/2014 | Bekas |
| 2015/0156077 | A1 | 6/2015 | Gao |
| 2017/0134957 | A1 | 5/2017 | Gupta |
| 2017/0353243 | A1 | 12/2017 | Brueckheimer |
| 2018/0121032 | A1 | 5/2018 | Naous |
| 2018/0322219 | A1 | 11/2018 | Bekas |
| 2018/0375953 | A1 | 12/2018 | Mont |

FOREIGN PATENT DOCUMENTS

| | | |
|---|---|---|
| EP | 1402355 | 8/2018 |
| WO | 2007038953 | 4/2007 |

OTHER PUBLICATIONS

Author Unknown, Bgplay.js, What is BGPlay.js? Printed on Apr. 7, 2015.
Author Unknown, RIPE Network Coordination Centre, printed on Apr. 7, 2015.
Author Unknown, Route View 6447, Route Views Project Page, University of Oregon Route Views Project, Jan. 27, 2005.
Author Unknown, Routing Information Service (RIS), Oct. 7, 2013.
Blunk et al., Multi-Threaded Routing Toolkit (MRT) Routing Information Export Format, Oct. 2011.
Lougheed et al., A Border Gateway Protocol (BGP), Jun. 1989.
Rekhter et al., A Border Gateway Protocol 4 (BGP-4), Jan. 2006.
Vazquez et al., Internet Topology at the Router and Autonomous System Level, 2002.
Hong et al., An Online Monitoring Solution for Complex Distributed Systems Based on Hierarchical Monitoring Agents, Knolwdge

(56) References Cited

OTHER PUBLICATIONS and Systems Engineering, vol. 1, Advances in Intelligent Systems and Computing 244, pp. 187-198, 2014.
Tonn et al., Asgard—A Graphical Monitoring Tool for Distributed Agent Infrastructures, Advances in PAAMS, AISC 70, pp. 163-173, 2010.

* cited by examiner

MONITORING ENTERPRISE NETWORKS WITH ENDPOINT AGENTS

CROSS REFERENCE TO OTHER APPLICATIONS

This application claims priority to U.S. Provisional Patent Application No. 62/350,632 entitled MONITORING ENTERPRISE NETWORKS WITH ENDPOINT AGENTS, filed Jun. 15, 2016, which is incorporated herein by reference for all purposes.

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Cloud computing generally refers to the use of computing resources (e.g., hardware and software) that are delivered as a service over a network (e.g., typically, the Internet). Cloud computing includes using remote services to provide a user's data, software, and computation.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

BRIEF DESCRIPTION OF THE DRAWINGS

Various embodiments of the invention are disclosed in the following detailed description and the accompanying drawings.

DETAILED DESCRIPTION

Figure 1:
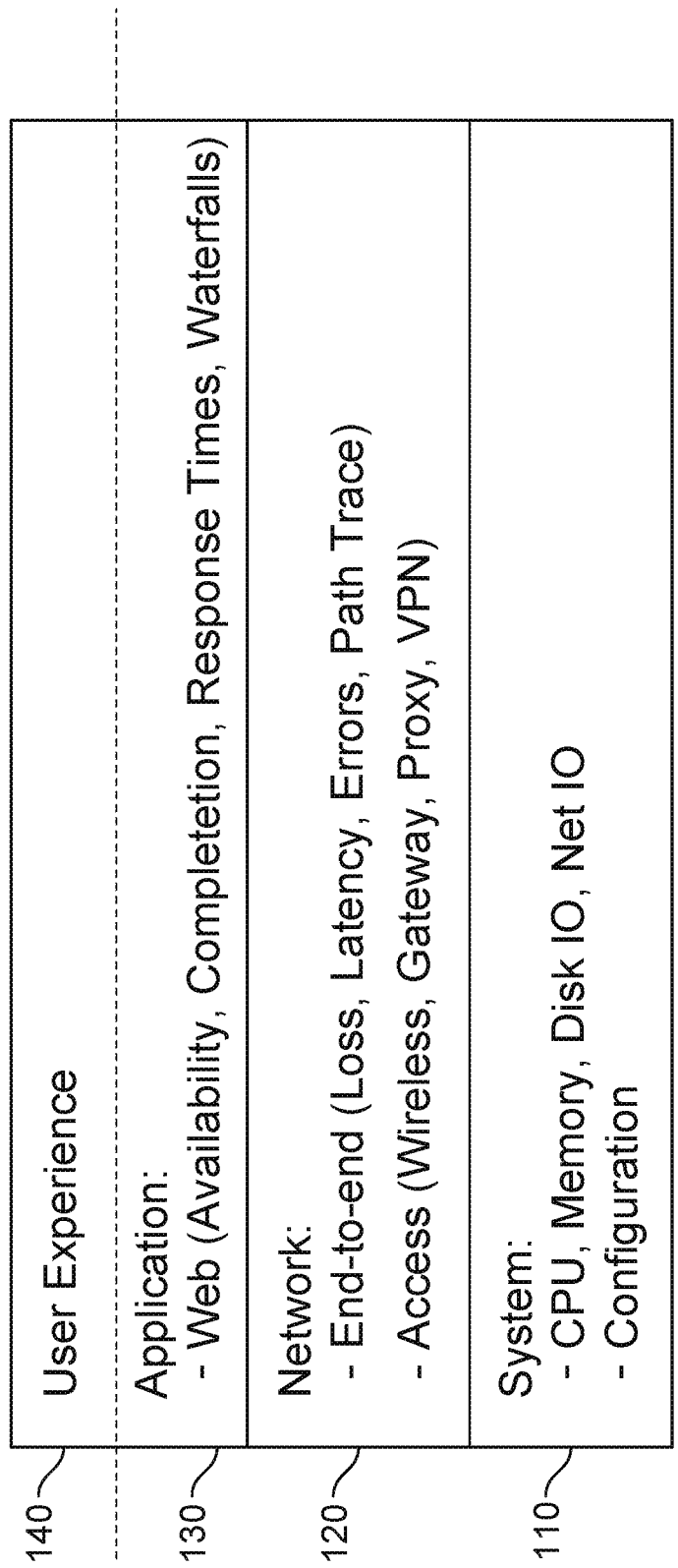
FIG. 1 is a network layer diagram illustrating that the data collected from endpoints is segmented into different network layers in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site can present significant challenges.

What are needed are new and improved techniques to monitor, visualize, and troubleshoot the performance of cloud-based/web-based services (e.g., distributed applications and SaaS-based solutions available as web services via web sites and/or using other cloud-based implementations of distributed applications).

Overview of Techniques for Monitoring Enterprise Networks with Endpoint Agents

Accordingly, techniques for monitoring enterprise networks (e.g., enterprise IT networks) with endpoint agents are disclosed.

In one embodiment, techniques for monitoring enterprise networks with endpoint agents are disclosed that can safely and securely collect information from end-user devices (e.g., client/user devices) without requiring any extra configuration from the end user. As described herein, an example implementation of the agent is referred to as an endpoint agent. In this example implementation, the endpoint agent can be implemented as a software package that can be executed on end-user devices (e.g., desktops, laptops, tablets, smart phones, and/or other devices) and monitors network activity associated with the user activities (e.g., the user browser activity) to capture user experience and infrastructure performance metrics as further described below.

In some embodiments, techniques for monitoring enterprise networks (e.g., enterprise IT networks) with endpoint agents are disclosed as further described below with respect to various embodiments. For example, an endpoint agent can generally refer to a functional component (e.g., software implemented as a software package executed on client/user devices) that is configured to perform one or more of the disclosed techniques. An endpoint can generally refer to the device where the endpoint agent is installed and/or executed, in which the endpoint is a data source for monitored network activity (e.g., monitored using the endpoint agent), as further described below. A Network Monitoring Service Provider (NMSP) cloud (e.g., provided by a network monitoring service provider, such as ThousandEyes, Inc. or another commercial network monitoring service provider) can generally refer to the backend services supporting the endpoint agent(s), as further described below. A data subscriber (e.g., an NMSP cloud subscriber) can generally refer to an account (e.g., a ThousandEyes account) that is entitled to receive data (e.g., monitored network activity data) from a set of endpoints, as further described below. An endpoint owner can generally refer to the account (e.g., ThousandEyes account) to which the endpoint (e.g., endpoint device) belongs, as further described below. A current network can generally refer to the network where the endpoint is connected to and using the Internet, as further described below.

In some embodiments, a data subscriber's configuration identifies one or more networks that are owned by the data subscriber and/or one or more networks that are associated with the data subscriber (e.g., networks to be monitored using the disclosed techniques for network monitoring with endpoint agents). For example, owned networks can generally refer to networks that are owned by data subscribers, as further described below. Monitored networks can generally refer to a range of IP addresses of endpoints of interest to the data subscriber, as further described below. Whitelisted domains can generally refer to domain names specified by the data subscriber, as further described below.

As further described below, these and various other features and techniques are disclosed for monitoring enterprise networks with endpoint agents.

Deployment of Endpoint Agents

In one embodiment, an endpoint agent is deployed to an endpoint via an installation package. For example, an endpoint owner Alice can download a customized installer, and when installed on an endpoint, this device can be associated with endpoint owner Alice. Configurations and updates can be automatically downloaded from an NMSP Cloud (e.g., periodically, on demand, and/or as needed). In this example, after the installation of the endpoint agent on the endpoint, no configurations would need to be performed by the end user.

Also, in some cases, installation of the endpoint agent on the endpoint can be automated (e.g., using Windows Group Policies and/or other commercially available solutions for such automated installations of software packages on end-user devices). As a result, such an automated installation would not require involvement by end users (e.g., providing for an easy and seamless deployment and execution of the endpoint agent on the endpoints that is transparent to the end users).

In an example implementation, the customized installers are generated on-demand by backend services. The build system creates a non-activated package, and when requested by the endpoint owner, the package is customized with a globally unique account token and the package is activated on the endpoint.

Endpoint Data Collection Using Endpoint Agents

In one embodiment, performance data collected from end-users is processed to determine how users are experiencing different applications, troubleshooting performance degradation, and establishing trends and patterns across physically distributed points in the network.

FIG. 1 is a network layer diagram illustrating that the data collected from endpoints is segmented into different network layers in accordance with some embodiments. In one embodiment, the data collected from endpoints is segmented into different layers as shown in FIG. 1.

For example, the data can be collected in the following ways: (1) user triggered; (2) periodic network access and system data; and/or (3) scheduled tests, as further described below. User triggered data collection can be triggered by user activity, such as triggered by user activity in the browser executed on the endpoint, and can collect data from all layers below the dashed line, including a system layer 110, a network layer 120, and an application layer 130 as shown in FIG. 1. Periodic network access and system data can be used to collect periodic active network measurements to network infrastructure and capture a system resource snapshot of the endpoint. In an example implementation, scheduled tests can be used to perform active probing from endpoints to predefined targets by an endpoint owner, including, for example, an HTTP server (e.g., a web server, such as a site associated with a cloud service, distributed application, or other network/distributed service/application), network and path trace, and/or other tests can be performed to collect data/measurements relevant to/from all the layers below the dashed line as shown in FIG. 1.

In this example, the data collected includes a combination of passive and active monitoring. In some cases, network access tests, system tests, and scheduled tests are periodic whereas the user session data (e.g., web application metrics that include network metrics towards the visited site, such as a web site) is triggered by user activity. As such, periodically collecting such data can provide a better representation of the local environment and a cleaner baseline to detect anomalies and compute trends associated with, for example, network activities and performance.

Technical Challenges to Collecting Data from Endpoints Using Endpoint Agents

Data collection from end-user devices has several technical challenges, such as due to mobility of end-user devices, limited resources of end-user devices, and privacy/security concerns for users/owners of end-user devices. Because end-user devices can move, the disclosed system and techniques are provided to handle moving between networks with different owners, technologies, set-ups, and/or other similar variables for mobile devices when collecting data from deployed endpoint agents. For example, assume that an end-user Bob is inside an enterprise environment and data collection is being performed by the endpoint agent executed on Bob's endpoint that includes monitoring network activities/performance on the local IT network (e.g., enterprise network). At the end of the day, Bob returns home and transitions to his privately owned network (e.g., home network). This example presents technical challenges for implementing the disclosed techniques using endpoint agents, such as for the following questions. Should data collection continue? Or should just a subset of the metrics be collected? If the data (or a subset of the data) is collected, who should be allowed access to this data? How to detect that the user is moving between networks (e.g., from an enterprise network to a home network or other networks)?

In some embodiments, to facilitate a solution to these technical challenges, the concept of a Data Collection Profile (DCP) is disclosed. In one embodiment, a DCP is provided that describes the domains that should trigger automatic recording (e.g., automatic data collection using the endpoint agent) when the user visits the domain in his/her browser; it defines if and how often periodic tests towards local network resources should be performed and/or other policies/rules can be configured based on the DCP.

For example, the DCP can be associated with a set of networks defined by the IP range of the public IP assigned to the end-user device. As such, the DCP can be used to facilitate defining different behavior as users move between various networks (e.g., from an enterprise network to a home network and/or to other networks). As an example, when Bob is using his laptop on the enterprise network while at the office of his employer's company, in which the enterprise network is defined by a predetermined IP address range, the DCP can be configured such that the endpoint agent can monitor domain set A and perform gateway/wireless periodic network tests. However, when Bob is using his laptop outside the office (e.g., or in this example, using any other networks), then the DCP can be configured such that the endpoint agent can only gather system information associated with his laptop.

In one embodiment, an active DCP is determined by a check-in request to the NMSP cloud that responds with the current DCP based on the public IP address of the check-in request. For example, this can include all information used to collect data until a network change is detected (e.g., the endpoint is associated with a different current network).

Network Identification

In one embodiment, techniques for correlation and network identification using a networkId are disclosed. In one embodiment, the networkId is specified as follows:

networkId=hash(publicIpRange+localPrefix)

where publicIpRange is the public prefix of the public IP address of the endpoint device based on, for example, WHOIS data (e.g., a WHOIS lookup), and localPrefix is the prefix of the local IP address of the device. The networkId facilitates correlating data within the same network across devices as described herein.

Example: Network Identification

For example, for device A on network X, which has public IP address 24.51.61.41 belonging to BGP prefix 24.51.61.0/24, and device A has local IP address 10.0.0.34 on a 255.255.255.0 subnet, the result in the networkId would be as shown below.

networkId=hash(24.51.61.0/24+10.0.0.0/24)

Verified Network Range

In an example implementation, an IT/network administrator can associate a DCP to any network range (e.g., in this example implementation, assuming that it is not verified by any other accounts at the NMSP). An account (e.g., subscriber of the NMSP) can verify a network range, ensuring that no other account can collect performance or network information from within the specific network.

For example, assume that an endpoint (with an installed endpoint agent) belonging to Alice visits the offices of the ACME Company. Also assume that ACME Company has an endpoint agent that is configured to monitor on all networks. However, when a device of ACME Company, such as Alice's device, enters BIGCO Company's network, the endpoint agent is disabled as BIGCO Company verified its network range (e.g., with the NMSP for the endpoint agent as described above). As such, only endpoint agents associated with BIGCO Company can collect data from within the verified network(s) associated with BIGCO Company.

In one embodiment, network validation of range R by company X can be performed using various techniques. Example techniques for performing network validation will now be described.

In one embodiment, network validation is performed using a WHOIS-based confirmation email. For example, range R can be looked up in WHOIS, and an email can then be sent to the email contact listed in the WHOIS look-up result. The email can include a unique validation token (e.g., provided by the NMSP) and a link that the recipient of the email can click on to validate ownership of range R. As such, once the recipient of the email clicks the link in the email, it validates ownership of the range R.

In one embodiment, network validation is performed using a DNS-based validation. For example, a user can insert a TXT entry pegged to the PTR entry they own (e.g., if they want to validate 192.168.2.0/24, then they can have a 192.168.2.verify_te TXT record with a unique validation token provided by the NMSP).

In one embodiment, network validation is performed using a manual validation. For example, a request can be sent to the NMSP (e.g., ThousandEyes) containing the IP range R that is to be validated and the requester.

Network Access Topology

In one embodiment, the endpoint agent performs periodic active measurements to access points, gateways, proxies, DNS servers, and VPN termination servers. For example, by performing such active measurements periodically, the agents can discover the topology of the network access and build a baseline of performance over time. In this example, each agent discovers the local environment using active measurements and information collected directly from the endpoints, such as wireless network quality to the access point, network performance to the gateway/proxy, DNS response time, and VPN performance metrics.

In one embodiment, for collecting local network performance data, a dynamic target list is deployed that is updated according to the user activity. For example, the dynamic target list can define which proxies and/or VPN servers should be targeted in the active network tests.

In an example implementation, a dynamic target list is a bounded list with a time expiration on each entry. In this example, if a proxy or VPN is used by the user in the browser, then the target is added to the list with the current timestamp (e.g., if only select traffic is routed through the VPN/proxy, and/or multiple VPNs/proxies exist dependent on the destination, this can produce multiple VPN/proxy targets; if the user never generated the specific traffic, the VPNs/proxies may not even be used). If the target already exists, then the timestamp is simply updated to the current time. If the list exceeds its maximum size, then the entry with the lowest timestamp is removed. The periodic network prober then uses this list and performs network tests against entries that have not expired. By maintaining a list per network, this facilitates the endpoint agent to continuously/periodically perform local network tests even when the user is moving between different networks.

In addition to the dynamic target list based on user activity including browsing activity, there are some targets that are independent of browsing activity, such as the default gateway. For example, the endpoint agent can be periodically probing the default gateway and measuring the wireless properties if it connects to the default gateway through a wireless interface.

Figure 2:
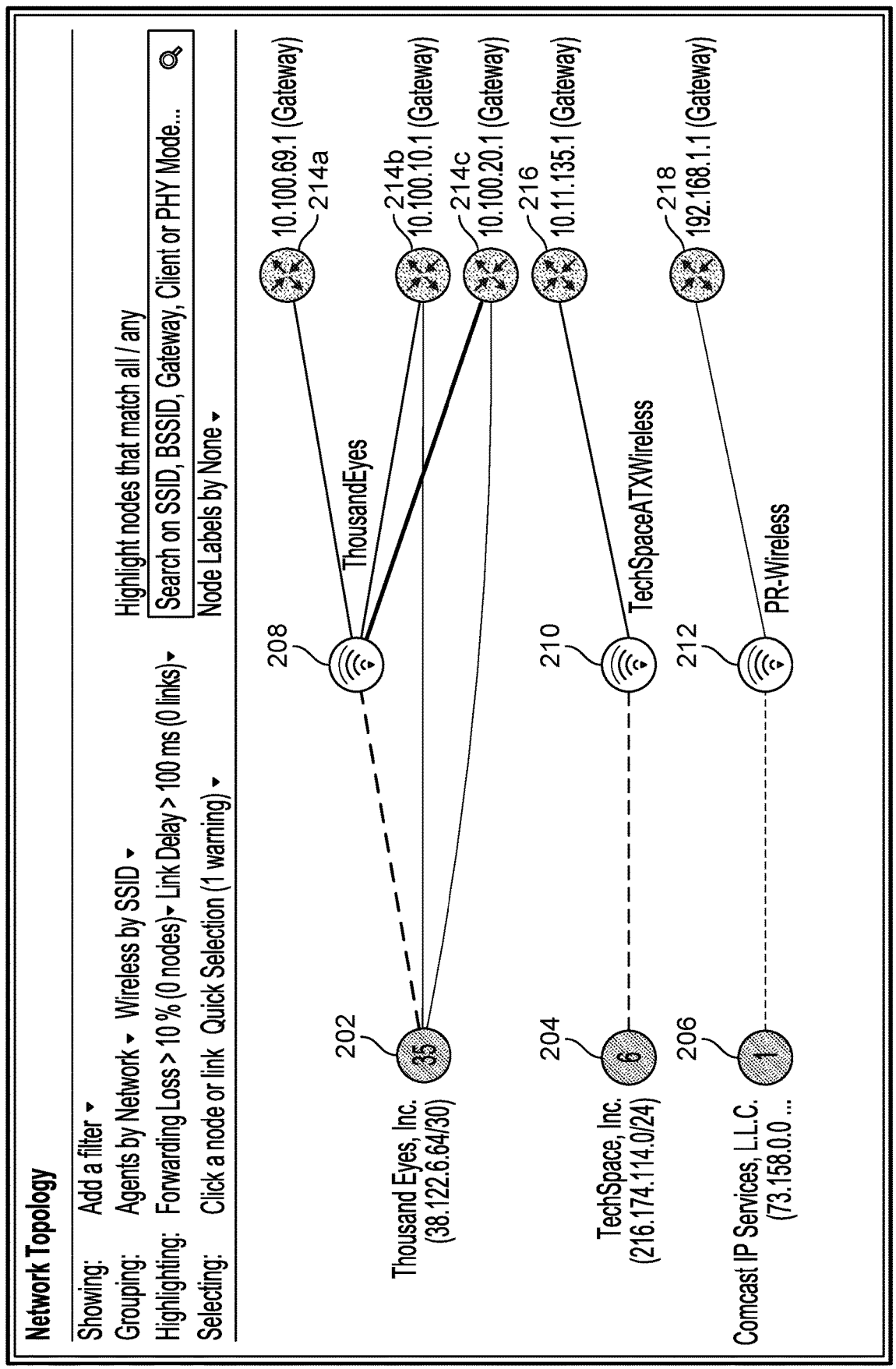
FIG. 2 is a graphical visualization of a network topology generated using endpoint agents in accordance with some embodiments.

FIG. 2 is a graphical visualization of a network topology generated using endpoint agents in accordance with some embodiments. As shown, endpoint agent groups 202, 204, and 206 can be utilized to facilitate a visualization of the access network for each of the agents over time, in this case including access points 208, 210, and 212, and which gateways are being used as shown at 214a-c, 216, and 218 (e.g., as well as a path(s) to VPN servers and proxies (not shown in this example in FIG. 2)). Examples of metrics collected can include one or more of the following listed metrics: transmission rate, wireless signal quality, gateway loss and latency, proxy loss and latency, and VPN server loss and latency.

Data Routing Workflow for Data Collected from Endpoint Agents

In one embodiment, a workflow for routing of collected data from deployed endpoint agents is performed as will now be described. Assume that an endpoint agent owned by ACME Company is inside a network R. Example scenarios of routing of the collected data (e.g., endpoint agent collected/aggregated data) are provided below.

If R is verified by BIGCO Company, then there is a conflict and the collected data (e.g., collected by the endpoint agent) is discarded.

If ACME Company subscribes to R or monitor all networks is enabled, then the collected data (e.g., collected by the endpoint agent) is routed to ACME Company.

If data subscriber C-CORP subscribes to data from ACME Company when in R and is approved by ACME Company, then the collected data (e.g., collected by the endpoint agent(a)) is routed to C-CORP.

If ACME Company does not subscribe to R, then the collected data (e.g., collected by the endpoint agent) is discarded.

The data routing mechanisms described above can be used with different types of end-user devices including mobile devices, laptops, desktops, tablets, and/or other end-user devices. It can also be applied for Virtual Desktop Infrastructure (VDI) environments, where users are behind thin clients connected to a central/VDI server as further described below.

Data Routing Workflow for Live Sharing for Data Collected from Endpoint Agents

In one embodiment, a workflow for routing of collected data from deployed endpoint agents is performed to facilitate live sharing of the collected data with one or more other entities as will now be described. Assume that an endpoint agent owned by ACME Company is inside a network R. Example scenarios of routing of the collected data (e.g., endpoint agent collected/aggregated data) to facilitate such live sharing techniques are provided below.

If another entity C-CORP requests to access the collected data from ACME Company and is approved by ACME Company (e.g., a pull request for live sharing, which may also include requesting that the entity/user authenticates that they are authorized for sharing such collected data as it is associated with their network domain and both entities/users approve of such live sharing), then the collected data (e.g., collected by the endpoint agent) is routed to C-CORP.

If ACME Corporation desires to provide access to the collected data from ACME Company (e.g., a pull request for live sharing, which may also include requesting that the entity/user authenticates that they are authorized for sharing such collected data as it is associated with their network domain and both entities/users approve of such live sharing), then the collected data (e.g., collected by the endpoint agent) is routed to C-CORP.

For example, such live sharing techniques for sharing the collected data can facilitate troubleshooting information to be shared by ACME Corporation with their Software as a Service (SaaS) provider (e.g., Microsoft for Office365 or another service/provider).

Example Endpoint Agent Architecture

Figure 3:
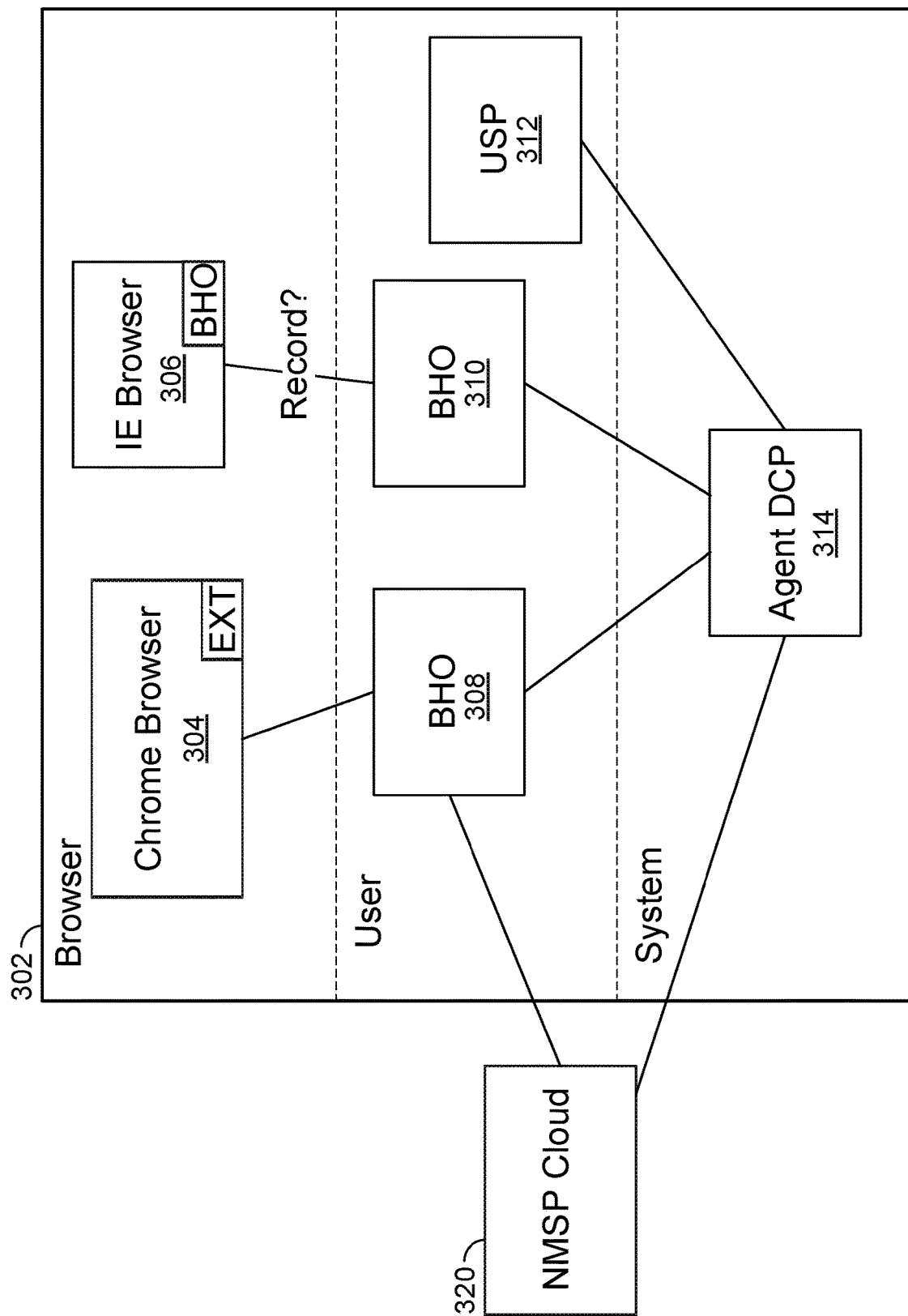
FIG. 3 is an architecture of an endpoint agent for an end-user device in accordance with some embodiments.

FIG. 3 is an architecture of an endpoint agent for an end-user device in accordance with some embodiments. In one embodiment, an endpoint agent (e.g., software package installable on end-user devices) includes multiple components installed and executed on an end-user device 302, which collaborate to collect and submit data to an NMSP cloud 320 as shown in FIG. 3.

Referring to FIG. 3, end-user device 302 is in network communication with NMSP cloud 320, such as via the Internet (not shown). The endpoint agent can include multiple components, which can be executed at different system layers (e.g., a system/kernel, a user space, and/or an application layer). In this embodiment, an agent DCP component 314 executes in the system layer and includes/stores the DCP for endpoint 302 received from NMSP cloud 320. Agent DCP is in communication with Browser Helper Objects (BHO) 308 and 310, which can communicate with browser applications, such as a Google Chrome® browser 304 and a Microsoft Internet Explorer® browser 306 as shown. For example, BHO 310 can be configured to monitor user browser activity on the endpoint, and as similarly described above, network activity monitoring/tests can be triggered/performed based on the site accessed by the user using IE browser 306 and based on the DCP configuration for endpoint 302 as provided via agent DCP 314 (e.g., based on the current network, network domain, and/or other DCP policies/rules as similarly described above). As also shown, a User Space Proxy (USP) component 312 executed in the user space is provided and is in communication with agent DCP 314 (e.g., the USP can be used for enterprise environments that have all HTTP traffic routed through an authenticated HTTP proxy to access the Internet, such as further described below in the User Space Proxy section). As similarly described above, the endpoint agent can be configured to perform system monitoring/tests as well as network monitoring/tests using these various components executed on the endpoint. The system and network monitoring/tests data/results can be communicated to NMSP cloud 320 (e.g., periodically, on demand, and/or as needed).

In an example implementation, the endpoint agent includes a te-agent component and a te-browserhelper component. These components can be installed automatically by the software installer package. In this example implementation, the te-agent component is responsible for performing active network measurements, communication with the NMSP cloud, and performing periodic network/system measurements.

In this example implementation, the browser activity is gathered using a te-browserhelper component, which communicates with the browser via JavaScript Object Notation (JSON) Remote Procedure Call (RPC) and uses a te-agent to perform network measurements. For the Google Chrome® web browser, a custom extension (EXT) is installed that gathers performance metrics and streams the data to the browserhelper (BHO) (e.g., BHO 308) as it becomes available. For the Microsoft Internet Explorer® (IE) web browser, a Browser Helper Object (BHO) is installed that monitors web activity and likewise streams the data to the browserhelper (e.g., BHO 310). Additional helper components can be utilized to facilitate automatic update and optional user interactions.

General Operation of Endpoint Agents and Interactions with NMSP Cloud

In one embodiment, the endpoint agent periodically checks in with the NMSP cloud, which includes its current network and system profile as well as internal usage statistics. The NMSP cloud responds with a set of configurations that determines what data should be collected from the current network.

For example, response provided by the NMSP cloud can include a domain whitelist (e.g., encoded using a Bloom filter). In the case of the endpoint agent, this whitelist can be consulted to determine if a given domain should automatically be recorded. The check-in can be performed periodically or when a network change is detected (e.g., or based on other configurations or events).

An example system architecture of a platform for providing the NMSP cloud is further described below with respect to FIG. 12.

Sample Data Collection from Endpoint Agents

In one embodiment, sample data is collected from the web browser and BHO working together. As described above, the endpoint agents can be implemented to support one or more commercially available web browsers, such as Google Chrome® and Microsoft Internet Explorer®. For Google Chrome, a standard Chrome extension can be used that uses the "chrome.webRequest" and "chrome.debugger" APIs of Chrome to extract timing and page information. For Internet Explorer, custom JavaScript can be injected into the page to extract the timing information.

Sample Types Including Extended Samples

In one embodiment, samples can be original or extended. A sample is original if a new page object triggered that sample (e.g., the first page in a session or if the user has been inactive for a configurable period and then browses to a new page). An extended sample is a sample that is triggered by a long running page that continuously generates entries (e.g., a one page website that refreshes its data every 30 seconds). After a configurable period of time, these periodic entries will trigger a new sample that is said to be extending the original sample.

Figure 4:
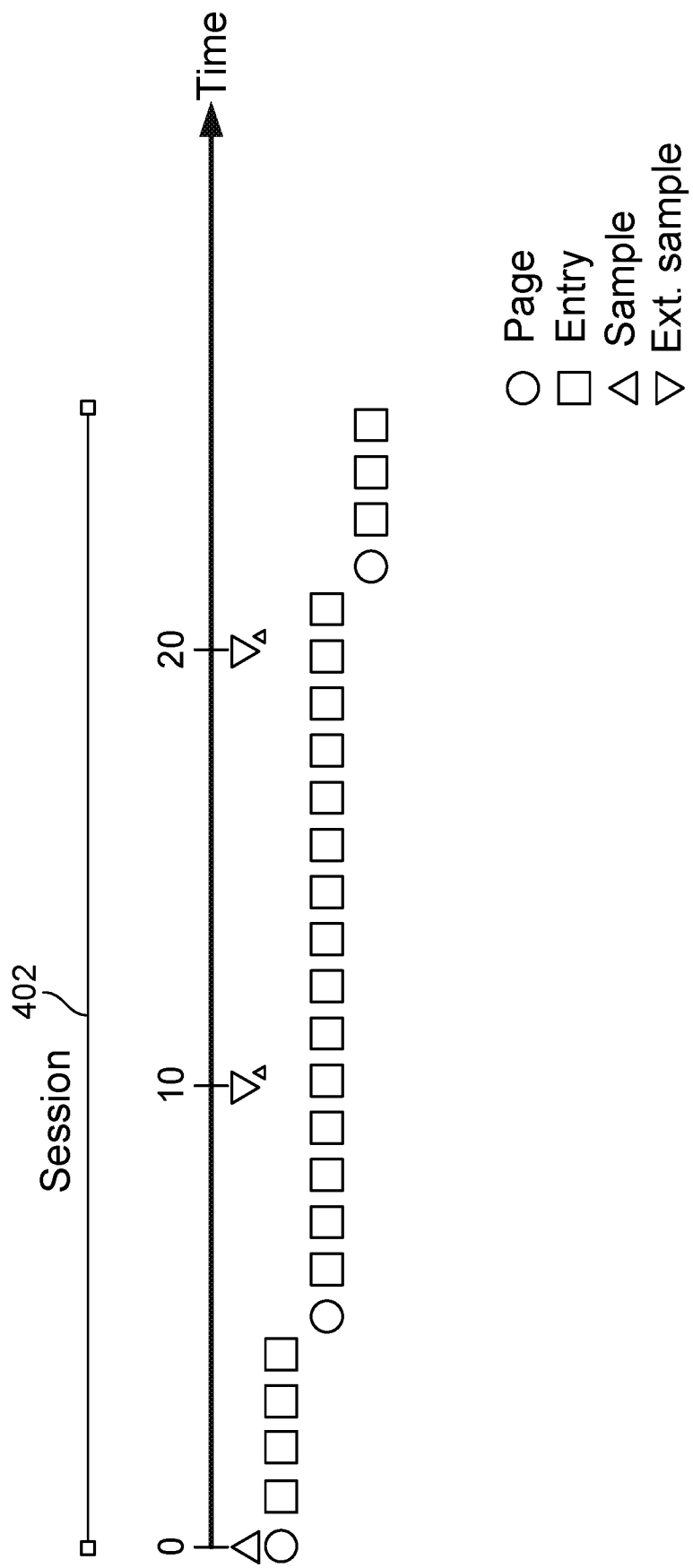
FIG. 4 illustrates an extended sample in accordance with some embodiments.

FIG. 4 illustrates an extended sample in accordance with some embodiments. Referring to FIG. 4, recording extended samples using the endpoint agent facilitates collecting network data for long running sessions, such as a session 402. For example, some sessions may span multiple hours or another extended period of time (e.g., a user may keep a browser open for a given site, such as Facebook, Salesforce.com, or another site/service for one or more days/weeks or another period of extended time). As shown, recording extended samples can trigger samples periodically to augment the entries as they are collected (e.g., for predetermined time intervals, such as every 5 minutes, 1 hour, or some other time interval).

RPC Protocol for Web Browsers

In an example implementation, the format is further designed to facilitate separation of responsibility. The browser-based data collection software (e.g., such as for Google Chrome and Microsoft Internet Explorer as described above) can be configured to be aware of Session, Page, and Entry objects. This makes the monitoring process more efficient as no processing is needed in the browsers. The BHO component can manage the samples and when to create extended samples, how the data for the sample is gathered, and/or other such operations.

A simple Remote Procedure Call (RPC) protocol exists for web browsers, as shown below.

StartSession( )→sessionid
AddPage(sessionId, pageObj)
AddEntry(sessionId, entryObj)
UpdatePage(sessionId, pageUpdateObj)
EndSession(sessionId)

UpdatePage( ) is used to send updated information about a page if such becomes available (e.g., page title changed, updated page timings are available, etc.).

Sample Network Data

In this example, the sample object includes additional network information captured during a session. Example additional network information captured during a session can include one or more of the following: host, protocol, and port of HTTP connection; positional coordinates (e.g., resolved using GPS, Wi-Fi location, or network location services); TCP connectivity test towards destination; loss/latency/jitter/traceroute to destination (ICMP); loss/latency/jitter to gateway (ICMP); loss/latency/jitter/traceroute to VPN (ICMP) if configured on the device; loss/latency/jitter/traceroute to HTTP proxy (ICMP) if configured on the device; network configuration profile of network interfaces including IP addresses, DNS servers, gateway, and potential next hop interfaces (in the case of VPNs); physical network information including wireless quality, bssid/ssid, channel, link speed, and/or similar physical network information; proxy configuration profile; and system information including CPU usage, network usage, memory, and disk.

Path Tracing from Endpoints

Figure 5:
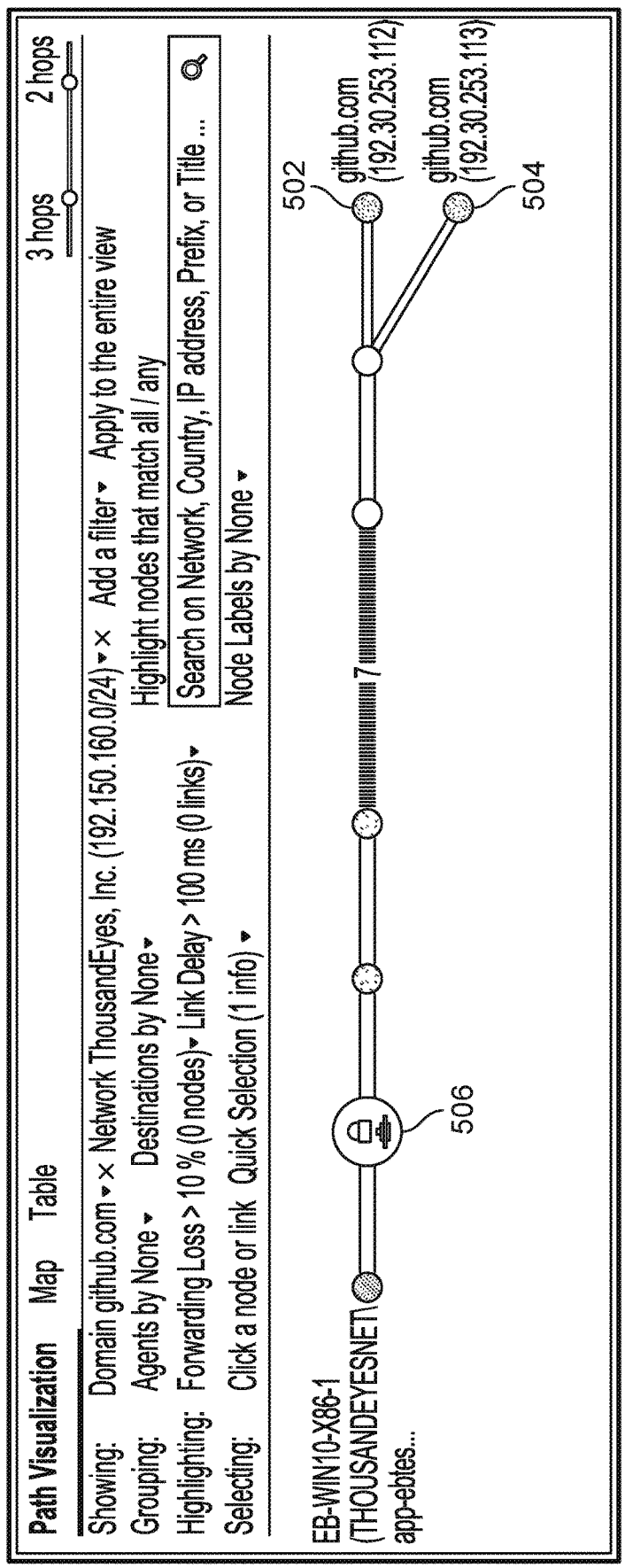
FIG. 5 is a graphical visualization that illustrates a path tracing from endpoints in accordance with some embodiments.

FIG. 5 is a graphical visualization that illustrates a path tracing from endpoints in accordance with some embodiments. In one embodiment, using similar techniques as described in co-pending U.S. Patent Application Publication No. US20130311832 entitled CROSS-LAYER TROUBLE-SHOOTING OF APPLICATION DELIVERY filed Mar. 15, 2013, which is incorporated herein by reference for all purposes, the path taken from a multitude of endpoints towards applications used in the browser can be reconstructed. Referring to FIG. 5, the web app Github is actually being served from two different servers as shown at 502 and 504.

In this example, a 1-hour time aggregation is used, in which the time aggregation can be configured by the user (e.g., from 5 minutes to 1 hour).

In an example implementation, known devices can be annotated in the path, such as in this example the first hop is a VPN server as shown at 506 in FIG. 5. This helps users to understand how their network is used by different applications and which network elements are associated with each user over time.

Endpoint Agent Communication with the NMSP Cloud

In an example implementation, communication with the backend/NMSP cloud is performed using HTTPS and JSON encoded body (e.g., or other (secure) protocols and encodings can be used). Gzip compression (e.g., or other compression algorithms can be used) is applied to minimize data transfer of the collected data over the network to prevent taking up too much network bandwidth when performing such communications between the endpoint agent and the NMSP cloud. Further, data entries can be batched where a batch can be uploaded when either of the following conditions is satisfied: 1) batch size exceeds configurable threshold; or 2) batch has not been changed within the last predetermined period of time (e.g., X seconds).

Security and Privacy for Data Collection by Endpoint Agents

As discussed above, collecting data from end-user devices sets high requirements for privacy and security. As such, in an example implementation, all communication with the NMSP cloud is performed over the HTTPS or another secure protocol and authenticated. For example, the authentication can be performed using a globally unique machineId and authentication token generated by the endpoint agent itself.

Also, to protect end-user privacy, HTTP body content and cookies can be removed from the HTTP Archive (HAR) data before leaving the browser memory space (e.g., metadata is retained).

In addition, in this example implementation, the domain whitelist downloaded during the check-in is encoded using a Bloom filter (e.g., false positives can be filtered in the NMSP cloud during upload) to prevent a potential attacker from retrieving a list of NMSP customers with verified domains.

User Space Proxy

In some enterprise environments, all HTTP traffic is routed through an authenticated HTTP proxy to access the Internet. When the authentication is based on the logged-in user, the system level account may not have access to the HTTP proxy which prevents the te-agent executing as system to connect to the NMSP cloud. To handle this case, in one embodiment, a User Space Proxy (USP) is used which is a binary that executes in the user space of the logged in users.

When one comes online, it contacts the endpoint agent and negotiates that it is able to proxy HTTP requests for the endpoint agent. In an example implementation, when the endpoint agent is to access the backend (e.g., NMSP cloud), the following checks are performed: (1) can the agent connect to the NMSP cloud directly or (if configured) via a network proxy; and (2) can the agent connect to the NMSP cloud via one of the USPs which will use the proxy and authentication configured on the user. In this example implementation, the agent is configured to prefer the above-described option for the agent to connect to the NMSP cloud directly or (if configured) via a network proxy, if possible. Further requests can be routed as determined by the above steps without checking the connectivity again. When the network state changes, the checks can be performed again.

Process Monitoring Using Endpoint Agents

In one embodiment, endpoint agents are configured to also perform process monitoring on endpoints. For example, endpoint agents can be configured to monitor for certain new processes (e.g., based on an association with a new socket open on the endpoint, which can be used to monitor various network connections including for non-web applications, such as connections between thin clients and a VDI server based on a process executed on the thin client for attaching to the VDI server). As another example, endpoint agents can be configured to monitor a specific type of process (e.g., a Skype process or another process), which can be performed to facilitate additional network layer 4 testing using endpoint agents. In addition, scheduled testing techniques as further described below can also be applied to perform these process monitoring techniques using endpoint agents.

Labels for Endpoint Agents

In one embodiment, endpoint agents are associated with labels (e.g., configurable and/or dynamic tags, such as to identify agents based on a current network, geographical location, and/or other criteria/state information associated with the endpoint or endpoint agent). For example, endpoint agents can be dynamically associated/tagged with labels based on a current network, location/geography, operating system (OS), current state information, and/or other runtime/state information associated with an agent/device, which can be used to schedule tests, visualization, live sharing, searching, and/or filtering data collected from the agents, in which labels are often associated with one or more network/endpoint properties.

As an example, assume that ACME Corporation has configured a label for endpoint agents identified as being located in the San Francisco office (e.g., based on a network associated with the endpoint agent, in which such is a dynamic label/tag based on the current network). In this example, scheduled tests can be directed to endpoint agents with a specified label (e.g., a scheduled HTTP test targeting SalesForce.com from agents associated with the San Francisco office (based on that label/tag), which will then be executed by endpoint agents if a given endpoint is in the San Francisco office at the specified time for the scheduled test, but would not be executed by endpoint agents if the endpoint is not currently connected to the network in the San Francisco office, such as for remote users who are working at home and/or users who are working from other offices of ACME Corporation).

Scheduled Tests for Endpoint Agents

In one embodiment, endpoint agents are configured to perform scheduled tests. In an example implementation, scheduled tests can be configured by an IT/network admin and distributed to deployed agents using an agent controller, such as further described herein.

For example, endpoint agents can be configured to perform scheduled tests based on user triggered events, and agents perform extra tests and capture data for test results. As another example, endpoint agents can be configured to perform scheduled tests in order to perform periodic network infrastructure tests. Example periodic network infrastructure tests can include path network tests, DNS tests, HTTP tests, and/or other network infrastructure tests. As yet another example, endpoint agents can be configured to perform scheduled tests based on a label(s) in which agents check-in periodically and/or based on network change at which point the agent controller can determine labels for such agents and which if any tests to be scheduled based on labels.

Alerting, Detecting Events, and Reporting Using Endpoint Agents

In one embodiment, alerts are generated using the disclosed techniques for enterprise network monitoring using endpoint agents. For example, a wireless gateway latency or packet loss event can be detected using the disclosed techniques as further described below with respect to example use case scenario A. As another example, alerts can be configured to be generated based on one or more trigger notifications when a set of properties match a predefined criteria. Also, trigger notification criteria can also be based on endpoint agent labels (e.g., a configured alert can select to generate an alert if a signal quality drops below 65% based on aggregated agents/endpoints in a San Francisco office for ACME Corporation by selecting criteria for endpoint agents with a label of San Francisco endpoints, and automatic deactivation of alert logic, such as if returns to above 65%).

In one embodiment, event detection is performed using the disclosed techniques for enterprise network monitoring using endpoint agents. For example, a wireless gateway latency or packet loss event can be detected using the disclosed techniques as further described below with respect to example use case scenario A.

In one embodiment, reports are generated using the disclosed techniques for enterprise network monitoring using endpoint agents. For example, reports can provide aggregated data, such as over a period of time (e.g., 30 days, 90 days, and/or some other configurable period of time). In an example implementation, reports include summaries of agent performance data that is aggregated, such as network performance over time for capacity planning purposes or other network management purposes, and/or to monitor latency and network performance for access to a cloud service, such as Microsoft Office 365 or another cloud service, in which different report templates can be provided for different IT/network users (e.g., network admin users, IT help desk users, IT system admin users, and/or other types/categories of users).

Example Use Cases

Figure 6:
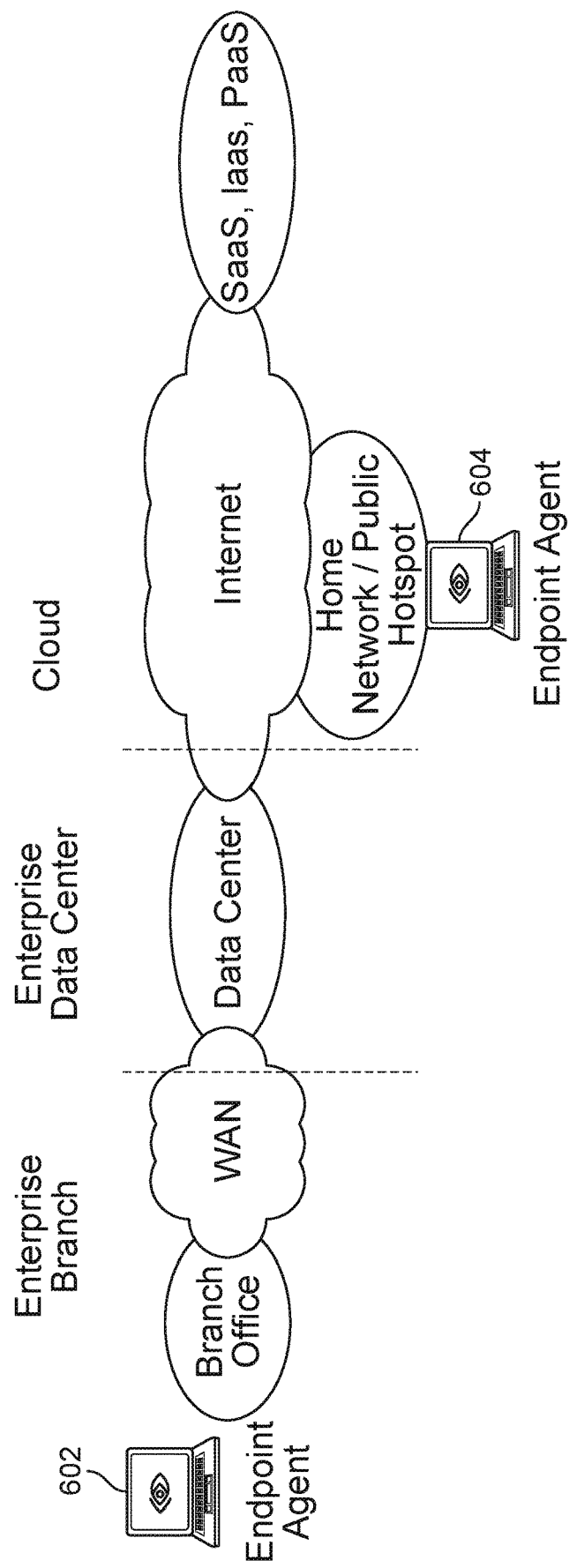
FIG. 6 is an example network environment that shows example endpoint agent deployments in accordance with some embodiments.

FIG. 6 is an example network environment that shows example endpoint agent deployments in accordance with some embodiments. Referring to FIG. 6, the endpoint agents can be deployed in endpoints that access various networks as shown by an endpoint agent deployed on an endpoint accessing an enterprise branch network as shown at 602 and as shown by another endpoint agent deployed on another endpoint accessing a home network/public Hotspot network as shown at 604.

Example Use Case a

In this example use case A, ACME Corporation uses Salesforce.com and Office365 to manage its customers and internal documents. Some employees have reported long response times and sporadic unavailability issues with the external services. The IT/network administrator(s) are not able to reproduce the problem on their machine(s), but the employees keep complaining about these performance problems. Each of Salesforce.com and Microsoft (for Office365) reports that their respective services/systems are in good health and are not having any performance problems.

By using the disclosed techniques, ACME Corporation can deploy endpoint agents on the employees' machines (e.g., if not already deployed) and collect an aggregate view of the user experiences. By monitoring the user/endpoints as they use these services (e.g., Salesforce.com and Office365) and capturing the browser performance data they are actually seeing from the respective endpoints, the IT/network administrators are able to pinpoint the problem(s). For example, the problem(s) can be related to a wireless signal, a local gateway, a high CPU and/or memory usage on the end-user devices/endpoints, a proxy issue, a routing issue to the external service (e.g., Salesforce.com and Office365), a third-party service that Salesforce.com or Office365 is dependent on (e.g., a Content Distribution Network (CDN) provider), a packet loss between the organization network and the SaaS, and/or various other network and/or system related problems as similarly described above.

Figure 7:
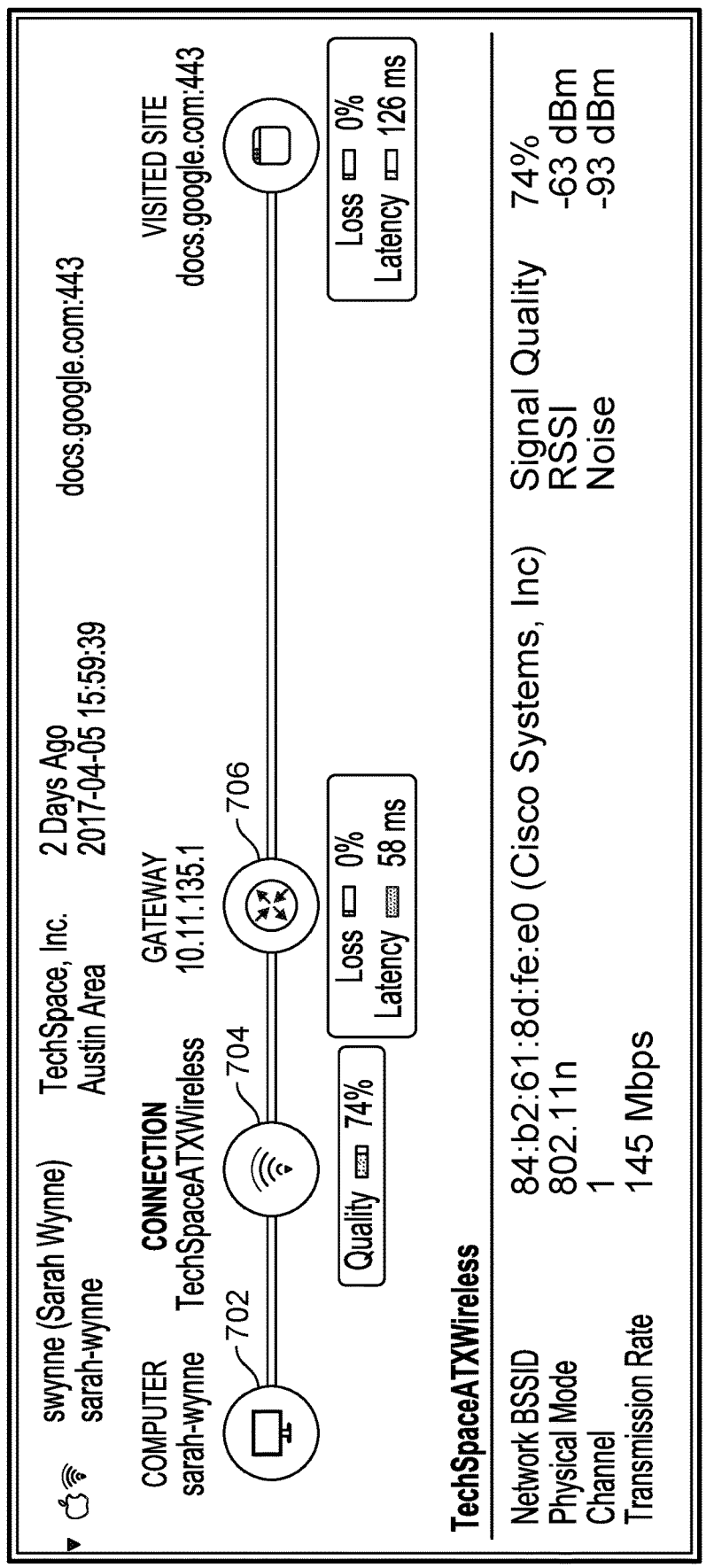
FIG. 7 is a graphical visualization that illustrates a high latency problem from an endpoint to a gateway via a wireless link that is identified using the disclosed techniques in accordance with some embodiments.

FIG. 7 is a graphical visualization that illustrates a high latency problem from an endpoint to a gateway via a wireless link that is identified using the disclosed techniques in accordance with some embodiments. In this example, the endpoint agent testing indicates that there is a high latency from an endpoint 702 via a wireless link 704 to a gateway 706 as shown in FIG. 7. As similarly described in the above example use case scenario, the endpoint agent collected data results can be used by IT/network admin(s) for ACME Corporation to identify/troubleshoot the performance problems (e.g., as due at least in part to this packet loss problem) experienced by users for various services, such as Salesforce.com and/or Microsoft Office365.

Figure 8:
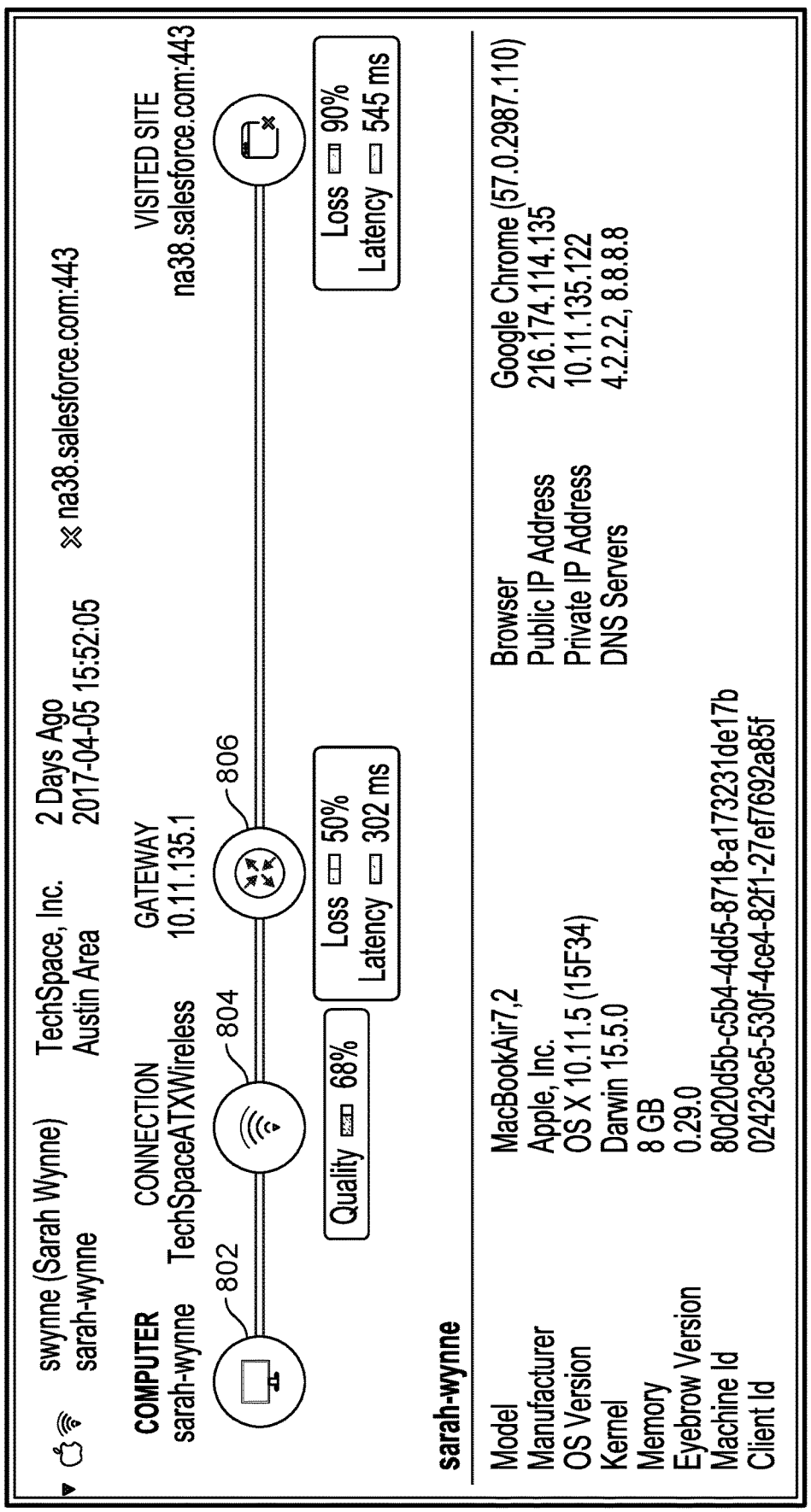
FIG. 8 is a graphical visualization that illustrates a packet loss problem from an endpoint to a gateway via a wireless link that is identified using the disclosed techniques in accordance with some embodiments.

FIG. 8 is a graphical visualization that illustrates a packet loss problem from an endpoint to a gateway via a wireless link that is identified using the disclosed techniques in accordance with some embodiments. In this example, the endpoint agent testing indicates that there is a high packet loss from an endpoint 802 via a wireless link 804 to a gateway 806 as shown in FIG. 8. As similarly described in the above example use case scenario, the endpoint agent collected data results can be used by IT/network admin(s) for ACME Corporation to identify/troubleshoot the performance problems (e.g., as due at least in part to this packet loss problem) experienced by users for various services, such as Salesforce.com and/or Microsoft Office365.

Figure 9:
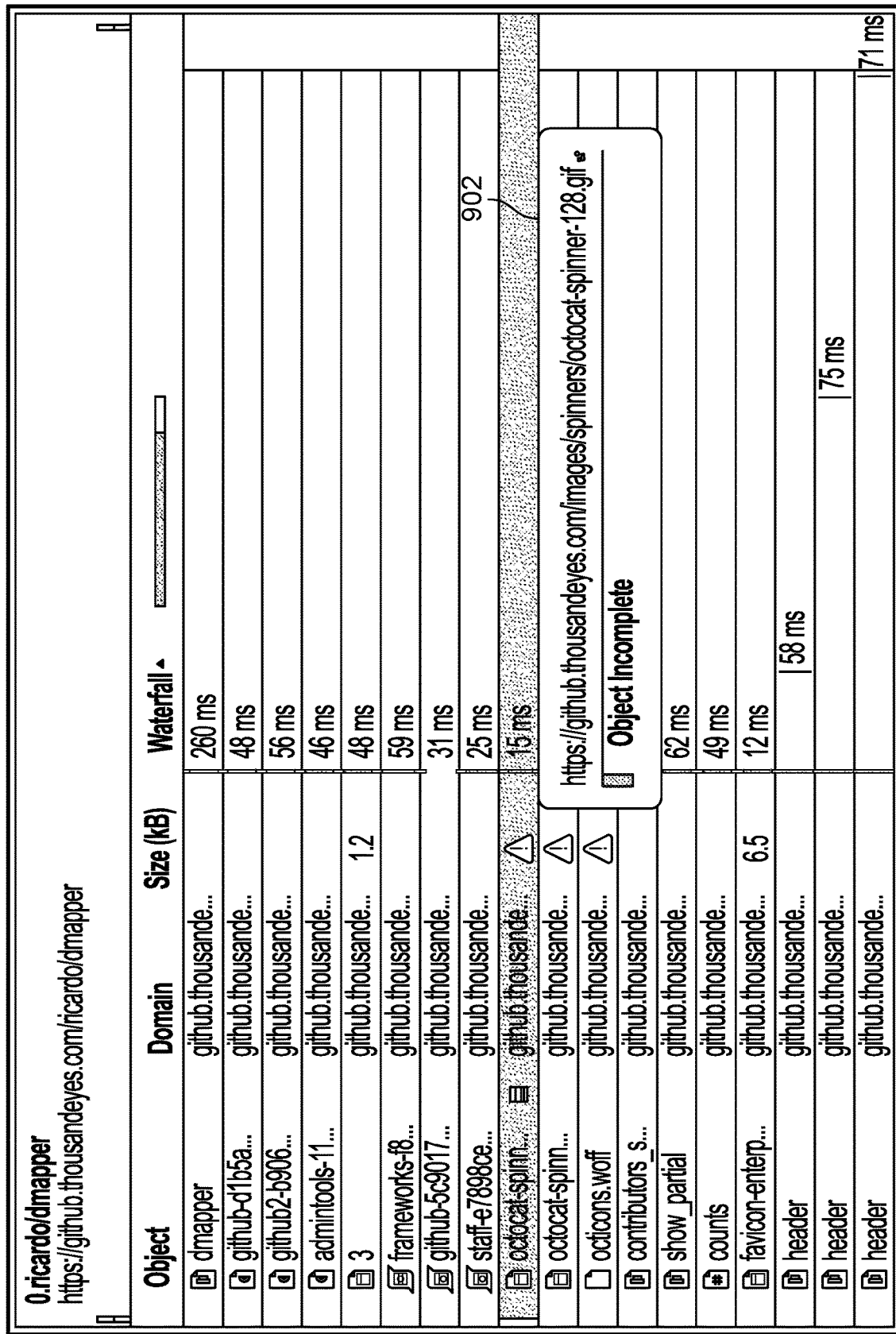
FIG. 9 is a graphical visualization that illustrates incomplete components on a web page problem that is identified using the disclosed techniques in accordance with some embodiments.

FIG. 9 is a graphical visualization that illustrates incomplete components on a web page problem that is identified using the disclosed techniques in accordance with some embodiments. In this example, the endpoint agent testing indicates that there are incomplete components on a web page problem as shown at 902 in FIG. 9. As similarly described in the above example use case scenario, the endpoint agent collected data results can be used by IT/network admin(s) for ACME Corporation to identify/troubleshoot the performance problems (e.g., as due at least in part to this incomplete components on a web page problem) experienced by users for various services, such as Salesforce.com and/or Microsoft Office365.

Example Use Case B

In this example use case B, ACME Corporation has branch offices in different geographical locations across the United States (e.g., in Miami, Fla. and in the San Francisco Bay Area in California), and is hosting an internal system at the headquarters. The branch offices are connected to the headquarters via VPN network connections. Further, ACME Corporation can have multiple employees working from home and working remote while on the road/business travel who are also connecting via VPN network connections. In this example, employees working from home are reporting that the internal system/service is unavailable at times and it is affecting their productivity. As each home office is unique and uses a variety of ISPs, it is difficult for the IT/network administrator(s) to pinpoint the problem(s).

By using the disclosed techniques, ACME Corporation can deploy endpoint agents to the employees' machines (e.g., if not already deployed) for the employees who are working from home and can collect an aggregate view of the user experiences for each of these remote users. As such, the IT/network administrator(s) can collect data reporting the system and network performance associated with each of these endpoints and their respective connectivity to the internal system/service. For example, this collected performance data from the endpoint agents can include home wireless signal quality, VPN connection to the headquarters, system load for each of the endpoints, Internet Service Provider (ISP) issues (e.g., packet loss, routing, high latency, and/or other network performance issues associated with the ISP's network), and the availability of the internal system/service itself.

Additional Visualizations Generated Using Data Collected from Endpoint Agents

Figure 10:
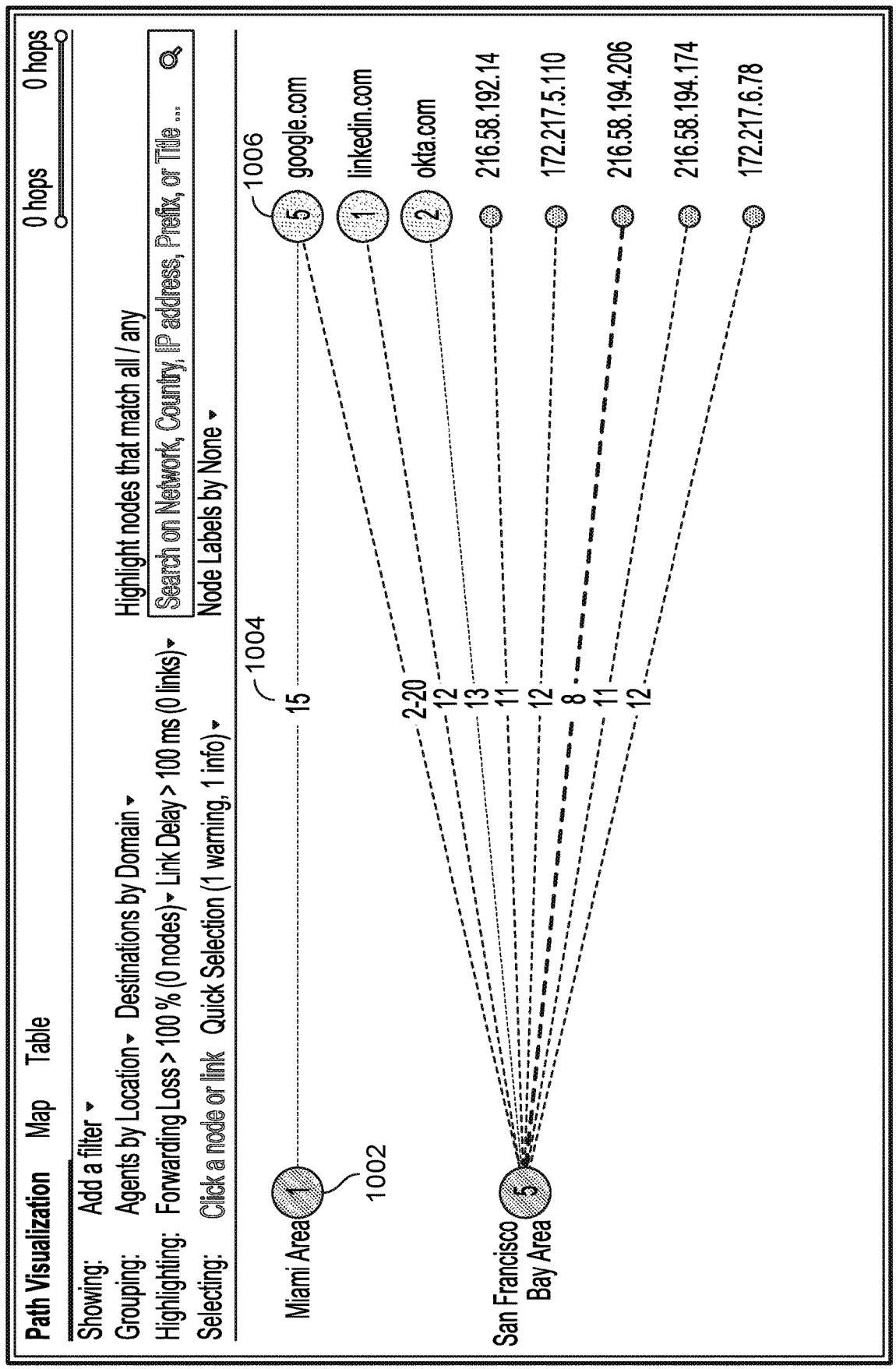
FIG. 10 is a graphical visualization that illustrates a path visualization node grouping view in accordance with some embodiments.

FIG. 10 is a graphical visualization that illustrates a path visualization node grouping view in accordance with some embodiments. In this example, the path between an endpoint agent 1002 and a destination site 1006 is shown in a path visualization node grouping that can be further drilled down into for a more detailed view of the path (e.g., including the additional 15 intermediate hops) as shown at 1004 in FIG. 10.

For example, the disclosed path visualization node grouping view techniques can be used to efficiently show results data with a larger number of intermediate hops between monitored endpoints and destination sites/services:

In one embodiment, the disclosed path visualization node grouping view techniques can be based on labels and/or configurable criteria (e.g., based on network infrastructure that includes public network, private network, or endpoint properties such as location, and/or other properties).

Figure 11:
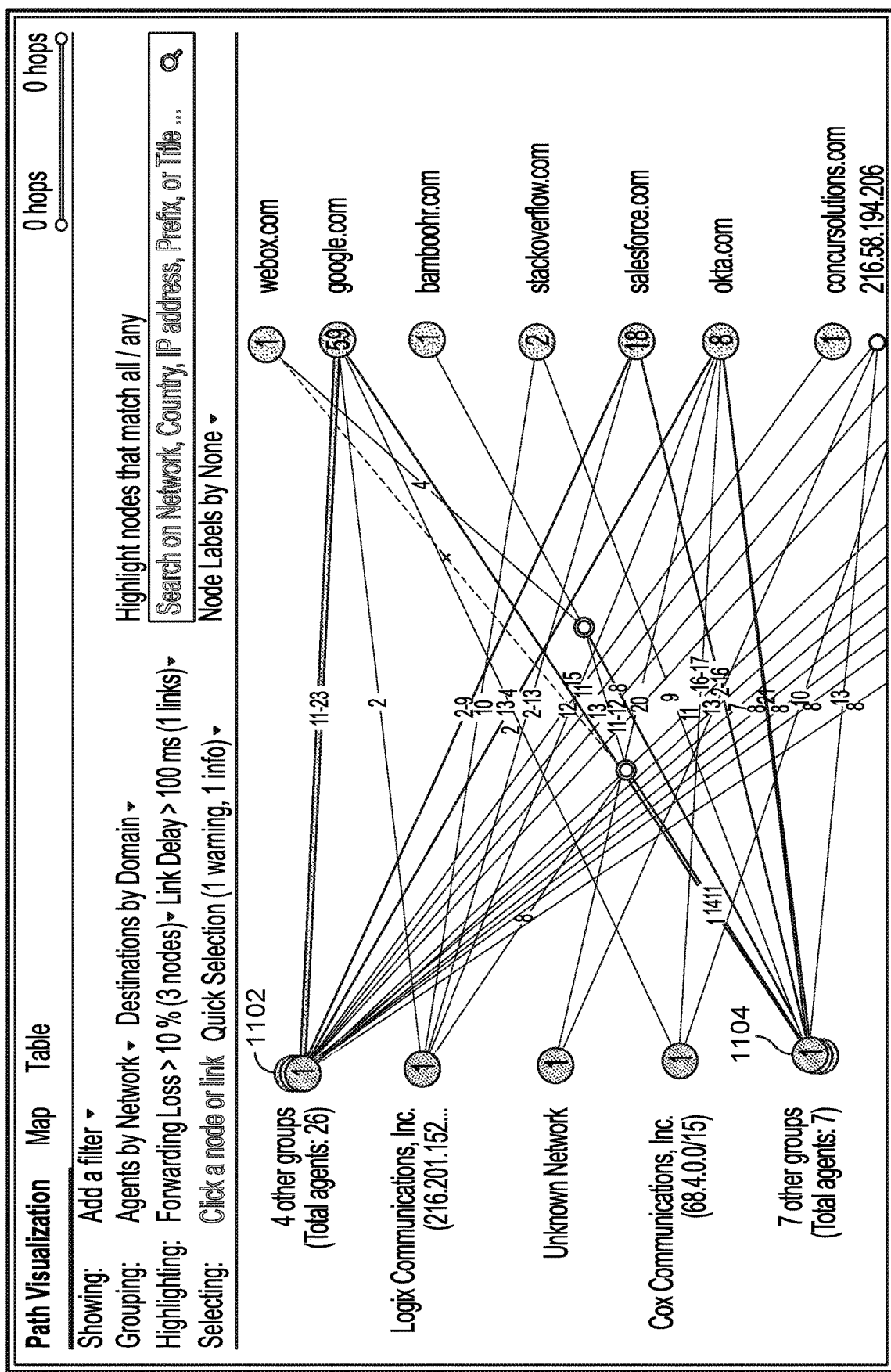
FIG. 11 is a graphical visualization that illustrates a path visualization node pagination view in accordance with some embodiments.

FIG. 11 is a graphical visualization that illustrates a path visualization node pagination view in accordance with some embodiments. In this example, an endpoint agent group 1102 and an endpoint agent group 1104 are each shown in a path visualization node pagination view that can be further drilled down into for a more detailed view of each of these respective groups of endpoint agents as shown in FIG. 11.

For example, the disclosed path visualization node pagination view techniques can be used to efficiently show results data from a large number of agents for customers with a larger number of endpoints being monitored:

In one embodiment, the disclosed path visualization node pagination view techniques can be based on labels and/or configurable criteria (e.g., based on network infrastructure that includes public network, private network, or endpoint properties such as location, and/or other properties).

Figure 12:
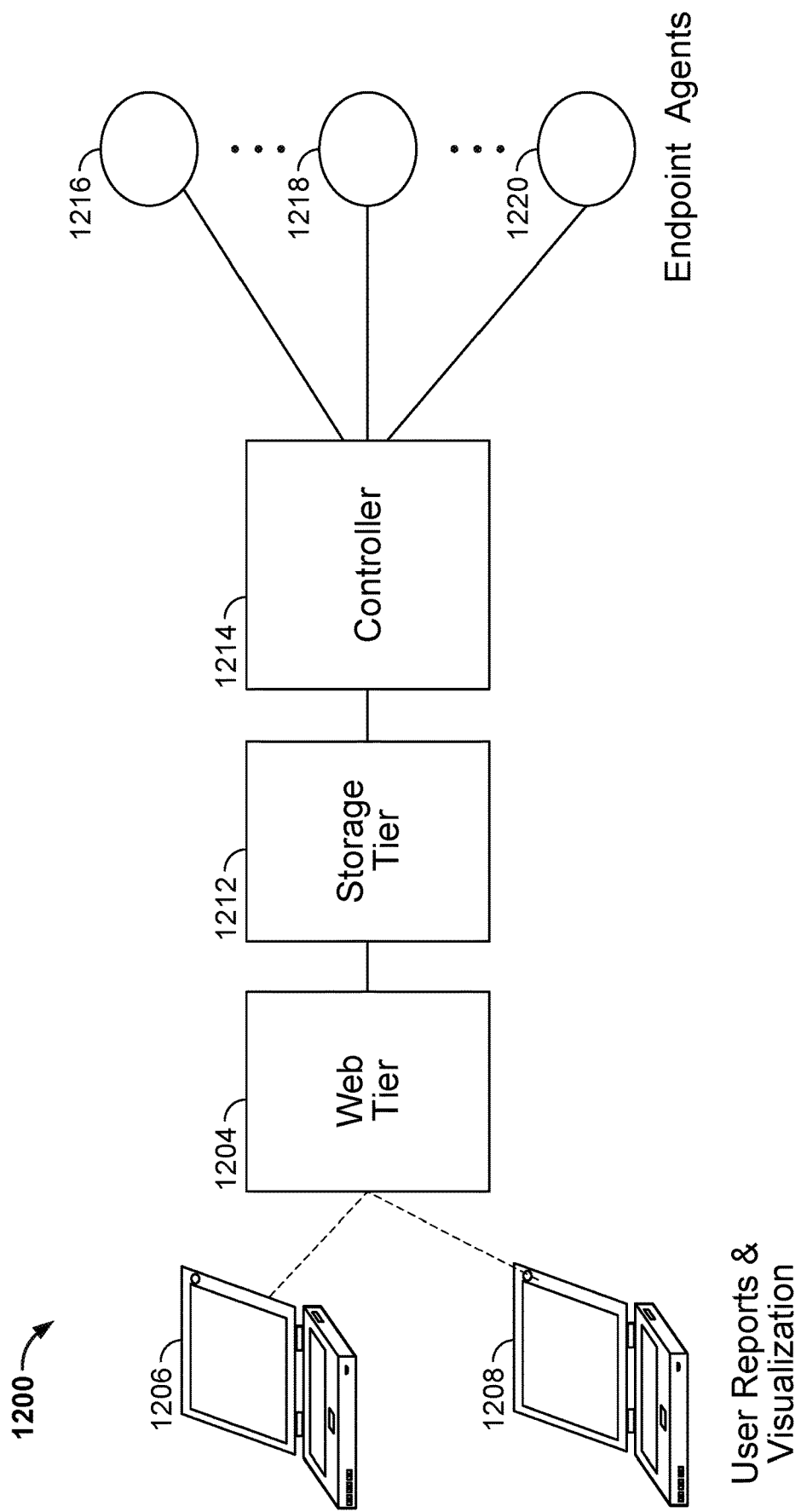
FIG. 12 illustrates a functional block diagram of a platform for providing enterprise network monitoring using endpoint agents in accordance with some embodiments.

System Architecture of a Platform for Providing Enterprise Network Monitoring Using Endpoint Agents An example of a system architecture of a platform for providing enterprise network monitoring using endpoint agents is shown in FIG. 12 as described below.

FIG. 12 illustrates a functional block diagram of a platform for providing enterprise network monitoring using endpoint agents in accordance with some embodiments. In particular, FIG. 12 illustrates an environment in which a platform for cross-layer visibility and troubleshooting of distributed applications 1200 includes endpoint agents 1216-1220 (e.g., which can be configured to perform certain tests, have labels, and/or perform on demand, event/context triggered, and/or scheduled tests, such as similarly described herein) that collect data based on configured tests, and the endpoint agents 1216-1220 send this data to a controller(s) 1214 (e.g., agent controller(s)). Controller 1214 stores the data in a storage tier 1212 (e.g., providing permanent storage) that can be used by a web tier 1204 to generate visualizations, alerts, and/or reports to users accessing the platform 1200 using client/endpoint devices (e.g., computers, laptops, smartphones, and/or various other computing devices).

For example, a report can be output to a user to present the collected and analyzed cross-layer application delivery information of a distributed application. Example reports can include various visualizations and/or diagnostic information as further described herein with respect to various embodiments. For example, the report can facilitate troubleshooting application delivery associated with the distributed application to determine whether performance problems are the result of the cloud provider of the distributed application, the customer's own internal IT network, a user's client device, and/or intermediate network providers between the user's client device and the cloud provider. The report can also include recommendations to the user to resolve any such determined application delivery problems associated with the distributed application. In some cases, the report can also be provided to a third party, such as the Software as a Service (SaaS) provider of the distributed application and/or a network provider, which can be provided as information to indicate the source of such determined application delivery problems associated with the distributed application.

In the example shown, the user of client/endpoint device 1206 (hereinafter referred to as "Bob") is employed as an IT manager of a distributed application company ("SaaS Company"). The user of client device 1208 (hereinafter referred to as "Alice") is employed as an IT manager of a national company ("ACME Company"). As will be described in more detail below, Bob and Alice can each access the services of platform 1200 (e.g., platform for cross-layer visibility and troubleshooting of distributed applications) via web tier 1204 over a network, such as the Internet. The techniques described herein can work with a variety of client devices 1206-1208 including, for example, personal computers, tablet computers, smartphones, and/or other computing devices.

In some embodiments, platform 1200 generates various reports based on results of the network performance tests to facilitate cross-layer visibility and troubleshooting of application delivery associated with a distributed application(s), as further described herein. In some embodiments, platform 1200 includes a data store, such as storage tier 1212, for storing results of the network performance tests and/or the reports.

In some embodiments, a set of agent controllers 1214 is provided as shown to send various tests (e.g., such as the various tests described herein with respect to various embodiments) to the endpoint agents for execution by the endpoint agents. For example, endpoint agents can be executed on client/endpoint devices, which are controlled by agent controllers to perform one or more tests as further described herein, in which the test results can be collected for correlation and analysis, as further described herein with respect to various embodiments.

In some embodiments, the tests are configured through a web interface by a user (e.g., an IT/network admin for ACME Corporation). For example, typical parameters can include the frequency of various tests (e.g., periodic, scheduled, on demand, and/or triggered based on events/context information associated with the agents/endpoints or other context information), the target of the tests, and the agents (e.g., based on labels and/or other criteria/context information associated with the agents/endpoints or other context information) where the tests are to be performed. The test parameters can be sent from the controller (e.g., agent controllers 1214) to the endpoint agents after an endpoint agent checks-in (e.g., using a pull mechanism). After an endpoint agent executes a test, the endpoint agent can export the test result(s) back to the controller. The controller can then provide the results back to a data store (e.g., storage tier 1212) for permanent storage (e.g., or temporary storage). Besides periodic tests, a controller can also send on-demand tests, scheduled, and/or triggered tests to an agent(s) through, for example, a Remote Procedure Call (RPC) for immediate or on-demand execution.

In various embodiments, platform 1200 is a scalable, elastic architecture and may comprise several distributed components, including components provided by one or more third parties. Further, when platform 1200 is referred to as performing a task, such as storing data or processing data, it is to be understood that a sub-component or multiple sub-components of platform 1200 (whether individually or in cooperation with third party components) may cooperate to perform that task.

In some embodiments, tests include various types of tests to facilitate cross-layer visibility and troubleshooting of application delivery associated with a distributed application(s), as further described herein. Example network tests include data path measurement tests, routing path measurement tests, and end-to-end network metrics tests. Example DNS tests include per name server testing and Domain Name System Security Extensions (DNSSEC) bottom-up validation tests. Example HTTP tests include testing of steps of a Uniform Resource Locator (URL) fetch. Example page load tests include testing of a load of an entire web page using a web browser (e.g., a typical web browser). Example transaction tests include performing a multi-step scripted transaction from a web browser (e.g., a typical web browser). These and various other tests are described herein.

Example processes for monitoring enterprise networks (e.g., enterprise IT networks) with endpoint agents using the disclosed techniques will now be described below.

Processes for Monitoring Enterprise Networks with Endpoint Agents

Figure 13:
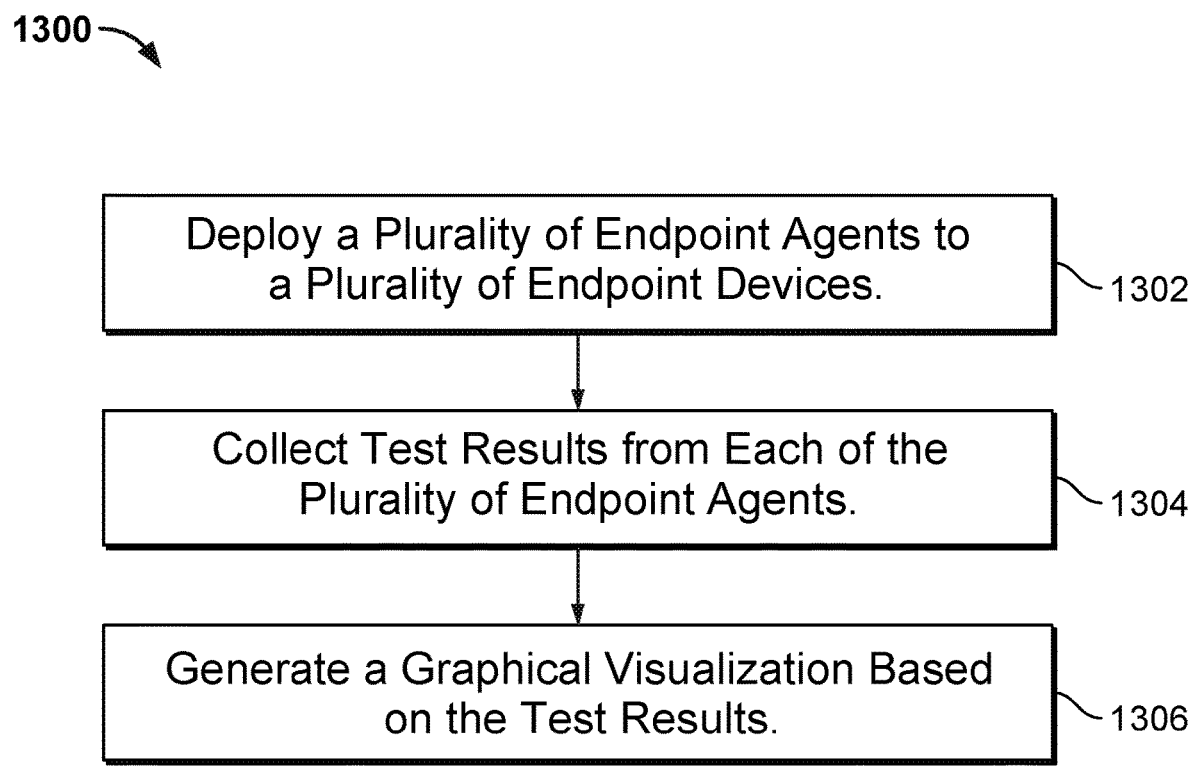
FIG. 13 illustrates a flow diagram for monitoring enterprise networks with endpoint agents in accordance with some embodiments.

FIG. 13 illustrates a flow diagram for monitoring enterprise networks with endpoint agents in accordance with some embodiments. In some embodiments, process 1300 is performed using platform 1200 as shown in FIG. 13.

At 1302, deploying a plurality of endpoint agents to a plurality of endpoint devices is performed. For example, a plurality of endpoint agents can be distributed to a plurality of endpoint devices using the platform described above. As similarly described above, an endpoint agent can be implemented using the endpoint architecture described above to perform the disclosed techniques for monitoring enterprise networks using endpoint agents.

In one embodiment, each of the plurality of endpoint agents performs network monitoring tests and system monitoring tests. For example, the endpoint agents can perform network monitoring tests and system monitoring tests (e.g., including process monitoring) as similarly described above.

In one embodiment, each of the plurality of endpoint agents is controlled by an agent controller. For example, the agent controller can facilitate deployment, configuration, and data collection operations with each of the plurality of endpoint agents.

In one embodiment, the tests that can be performed by the endpoint agents on the endpoint devices are configurable. For example, the tests can be configured to be performed based on a schedule, periodically, on demand, and/or based on a trigger as similarly described above. As another example, the test can be configured to be performed based on labels associated with the endpoint agents as similarly described above.

At 1304, collecting test results from each of the plurality of endpoint agents is performed, wherein the test results are based on tests executed on each of the plurality of endpoint devices for monitoring network activity. For example, test results from each of the plurality of endpoint agents can be collected using the platform described above. As similarly described above, endpoint agents can provide user experience monitoring to facilitate diagnosis and troubleshooting of network performance and/or endpoint device system performance problems.

At 1306, generating a graphic visualization based on the test results is performed. For example, a graphical visualization of an application delivery state for one or more application delivery layers based on the test results can be generated and output using the disclosed platform (e.g., generated by a web tier of the platform described above).

In one embodiment, the graphical visualization of the application delivery state facilitates troubleshooting of network performance problems associated with one or more of the plurality of endpoint devices. Example graphical visualizations that can be generated include the GUI visualizations similarly described above (e.g., including node grouping, node pagination, and network infrastructure visualizations as similarly described above).

Figure 14:
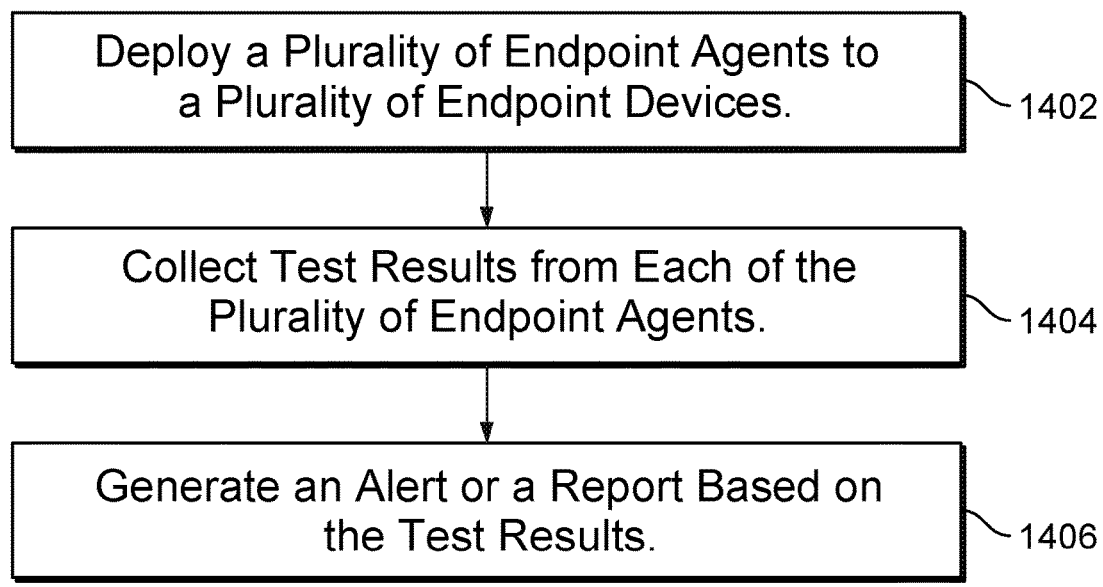
FIG. 14 illustrates another flow diagram for monitoring enterprise networks with endpoint agents in accordance with some embodiments.

FIG. 14 illustrates another flow diagram for monitoring enterprise networks with endpoint agents in accordance with some embodiments. In some embodiments, process 1400 is performed using platform 1200 as shown in FIG. 14.

At 1402, deploying a plurality of endpoint agents to a plurality of endpoint devices is performed. For example, a plurality of endpoint agents can be distributed to a plurality of endpoint devices using the platform described above. As similarly described above, an endpoint agent can be implemented using the endpoint architecture described above to perform the disclosed techniques for monitoring enterprise networks using endpoint agents.

At 1404, collecting test results from each of the plurality of endpoint agents is performed, wherein the test results are based on tests executed on each of the plurality of endpoint devices for monitoring network activity. For example, test results from each of the plurality of endpoint agents can be collected using the platform described above. As similarly described above, endpoint agents can provide user experience monitoring to facilitate diagnosis and troubleshooting of network performance and/or endpoint device system performance problems.

At 1406, generating an alert or a report based on the test results is performed. For example, an alert based on the test results can be generated and output (e.g., a GUI alert, an email/text/phone call alert, and/or other alert notification can be provided based on a configuration for alert notifications and/or based on the alert). As another example, a report can be generated that includes aggregated test data results, such as over a period of time (e.g., 30 days, 90 days, and/or some other configurable period of time). As yet another example, the alert or report can include an event that is determined based on the test results (e.g., events can be based on results from one endpoint agent and/or based on results from two or more endpoint agents (collective intelligence based on endpoint agent data collection, which can also include test results from other agents executed on network infrastructure elements/devices, destination sites, and/or cloud agents)). Example events that can be detected using the disclosed techniques can include detection of traffic outages, network infrastructure outages, application outages, and Internet Intelligence.

Figure 15:
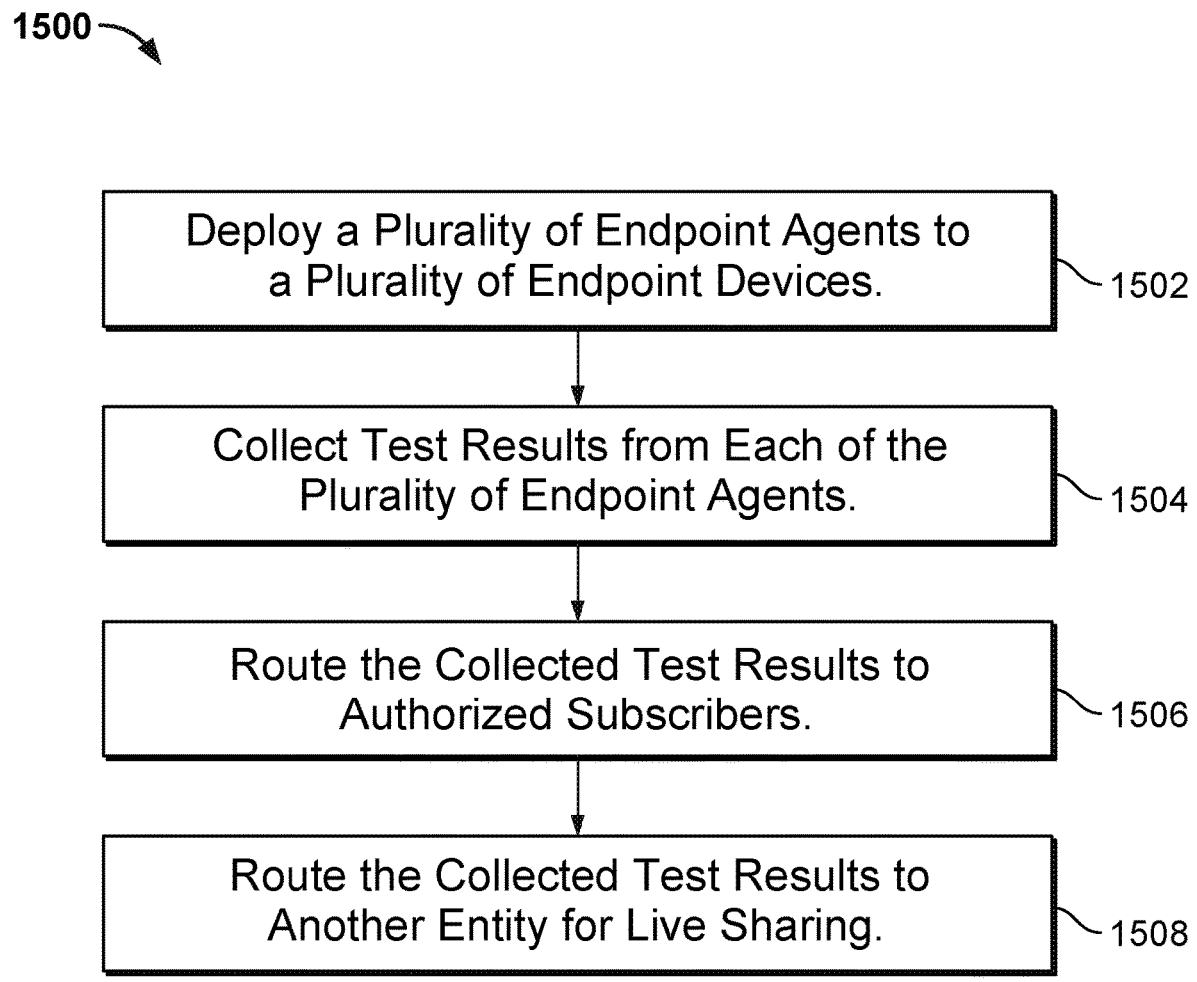
FIG. 15 illustrates another flow diagram for monitoring enterprise networks with endpoint agents in accordance with some embodiments.

FIG. 15 illustrates another flow diagram for monitoring enterprise networks with endpoint agents in accordance with some embodiments. In some embodiments, process 1500 is performed using platform 1200 as shown in FIG. 15.

At 1502, deploying a plurality of endpoint agents to a plurality of endpoint devices is performed. For example, a plurality of endpoint agents can be distributed to a plurality of endpoint devices using the platform described above. As similarly described above, an endpoint agent can be implemented using the endpoint architecture described above to perform the disclosed techniques for monitoring enterprise networks using endpoint agents.

At 1504, collecting test results from each of the plurality of endpoint agents is performed, wherein the test results are based on tests executed on each of the plurality of endpoint devices for monitoring network activity. For example, test results from each of the plurality of endpoint agents can be collected using the platform described above. As similarly described above, endpoint agents can provide user experience monitoring to facilitate diagnosis and troubleshooting of network performance and/or endpoint device system performance problems.

At 1506, routing the collected test results to authorized subscribers is performed. For example, the routing of collected test results to authorized subscribers can be performed as similarly described above (e.g., as similarly described above in the section entitled, Data Routing Workflow for Data Collected from Endpoint Agents).

At 1508, routing the collected test results to another entity for live sharing is performed. For example, the routing of collected test results to another entity for live sharing can be performed as similarly described above (e.g., as similarly described above in the section entitled, Data Routing Workflow for Live Sharing for Data Collected from Endpoint Agents). For example, such live sharing techniques for sharing the collected data can facilitate troubleshooting information to be shared by ACME Corporation with their Software as a Service (SaaS) provider (e.g., Microsoft for Office365 or another service/provider).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
deploy a plurality of endpoint agents to a plurality of endpoint devices;
collect test results from each of the plurality of endpoint agents for a plurality of tests, wherein the test results are based on tests executed on each of the plurality of endpoint devices for monitoring network activity, wherein periodic network access and system data are used to collect periodic active network measurements to network infrastructure and to capture a system resource snapshot of each of the plurality of endpoint devices based on a data collection profile, and wherein the data collection profile (DCP) includes a configured plurality of domains that are monitored for triggering automatic data collection using one of the plurality of endpoint agents when a user visits one or more of configured plurality of domains using a browser executed on one of the plurality of endpoint devices, and wherein the DCP includes a frequency for performing the periodic network measurements; and
generate a graphical visualization of an application delivery state for one or more application delivery layers based on the test results;
and
a memory coupled to the processor and configured to provide the processor with instructions.

2. The system recited in claim 1, wherein the graphical visualization of the application delivery state facilitates troubleshooting of network performance problems associated with one or more of the plurality of endpoint devices.

3. The system recited in claim 1, wherein each of the plurality of endpoint agents performs network monitoring tests and system monitoring tests.

4. The system recited in claim 1, wherein each of the plurality of endpoint agents is controlled by an agent controller.

5. The system recited in claim 1, wherein the graphical visualization is generated by a web tier.

6. The system recited in claim 1, wherein each of the plurality of tests that can be performed by the endpoint agents on the endpoint devices is configurable.

7. The system recited in claim 1, wherein the processor is further configured to:
output the graphical visualization of the application delivery state based on the test results.

8. The system recited in claim 1, wherein the test results are collected in one or more of the following ways: user triggered, periodic network access and system data; and/or scheduled tests.

9. A method, comprising:
deploying a plurality of endpoint agents to a plurality of endpoint devices;
collecting test results from each of the plurality of endpoint agents for a plurality of tests, wherein the test results are based on tests executed on each of the plurality of endpoint devices for monitoring network activity, wherein periodic network access and system data are used to collect periodic active network measurements to network infrastructure and to capture a system resource snapshot of each of the plurality of endpoint devices based on a data collection profile, and wherein the data collection profile (DCP) includes a configured plurality of domains that are monitored for triggering automatic data collection using one of the plurality of endpoint agents when a user visits one or more of configured plurality of domains using a browser executed on one of the plurality of endpoint devices, and wherein the DCP includes a frequency for performing the periodic network measurements; and
generating a graphical visualization of an application delivery state for one or more application delivery layers based on the test results.

10. The method of claim 9, wherein the graphical visualization of the application delivery state facilitates troubleshooting of network performance problems associated with one or more of the plurality of endpoint devices.

11. The method of claim 9, wherein the plurality of endpoint agents perform network monitoring tests and system monitoring tests.

12. The method of claim 9, wherein the plurality of endpoint agents are controlled by an agent controller.

13. The method of claim 9, wherein the graphical visualization is generated by a web tier.

14. The method of claim 9, wherein a plurality of tests that can be performed by the endpoint agents on the endpoint devices are configurable.

15. The method of claim 9, wherein the test results are collected in one or more of the following ways: user triggered, periodic network access and system data; and/or scheduled tests.

16. A computer program product, the computer program product being embodied in a non-transitory tangible computer readable storage medium and comprising computer instructions for:
deploying a plurality of endpoint agents to a plurality of endpoint devices;
collecting test results from each of the plurality of endpoint agents for a plurality of tests, wherein the test results are based on tests executed on each of the plurality of endpoint devices for monitoring network activity, wherein periodic network access and system data are used to collect periodic active network measurements to network infrastructure and to capture a system resource snapshot of each of the plurality of endpoint devices based on a data collection profile, and wherein the data collection profile (DCP) includes a configured plurality of domains that are monitored for triggering automatic data collection using one of the plurality of endpoint agents when a user visits one or more of configured plurality of domains using a browser executed on one of the plurality of endpoint devices, and wherein the DCP includes a frequency for performing the periodic network measurements; and
generating a graphical visualization of an application delivery state for one or more application delivery layers based on the test results.

17. The computer program product recited in claim 16, wherein the graphical visualization of the application delivery state facilitates troubleshooting of network performance problems associated with one or more of the plurality of endpoint devices.

18. The computer program product recited in claim 16, wherein the plurality of endpoint agents perform network monitoring tests and system monitoring tests.

19. The computer program product recited in claim 16, wherein the graphical visualization is generated by a web tier.

20. The computer program product recited in claim 16, wherein each of the plurality of tests that can be performed by the endpoint agents on the endpoint devices is configurable.

21. The computer program product recited in claim 16, wherein each of the plurality of endpoint agents is controlled by an agent controller.

22. The computer program product recited in claim 16, wherein the test results are collected in one or more of the following ways: user triggered, periodic network access and system data; and/or scheduled tests.

23. A system, comprising:
a processor configured to:
deploy a plurality of endpoint agents to a plurality of endpoint devices;
collect test results from each of the plurality of endpoint agents, wherein the test results are based on tests executed on each of the plurality of endpoint devices for monitoring network activity, wherein periodic network access and system data are used to collect periodic active network measurements to network infrastructure and to capture a system resource snapshot of each of the plurality of endpoint devices based on a data collection profile, and wherein the data collection profile (DCP) includes a configured plurality of domains that are monitored for triggering automatic data collection using one of the plurality of endpoint agents when a user visits one or more of configured plurality of domains using a browser executed on one of the plurality of endpoint devices, and wherein the DCP includes a frequency for performing the periodic network measurements; and
generate an alert or a report based on the test results; and
a memory coupled to the processor and configured to provide the processor with instructions.

24. The system recited in claim 23, wherein the test results are collected in one or more of the following ways: user triggered, periodic network access and system data; and/or scheduled tests.

25. A method, comprising:
deploying a plurality of endpoint agents to a plurality of endpoint devices;
collecting test results from each of the plurality of endpoint agents for a plurality of tests, wherein the test results are based on tests executed on each of the plurality of endpoint devices for monitoring network activity, wherein periodic network access and system data are used to collect periodic active network measurements to network infrastructure and to capture a system resource snapshot of each of the plurality of endpoint devices based on a data collection profile, and wherein the data collection profile (DCP) includes a configured plurality of domains that are monitored for triggering automatic data collection using one of the plurality of endpoint agents when a user visits one or more of configured plurality of domains using a browser executed on one of the plurality of endpoint devices, and wherein the DCP includes a frequency for performing the periodic network measurements; and generating an alert or a report based on the test results.

26. The method of claim 25, wherein the test results are collected in one or more of the following ways: user triggered, periodic network access and system data; and/or scheduled tests.

27. A computer program product, the computer program product being embodied in a non-transitory tangible computer readable storage medium and comprising computer instructions for:

deploying a plurality of endpoint agents to a plurality of endpoint devices;

collecting test results from each of the plurality of endpoint agents for a plurality of tests, wherein the test results are based on tests executed on each of the plurality of endpoint devices for monitoring network activity, wherein periodic network access and system data are used to collect periodic active network measurements to network infrastructure and to capture a system resource snapshot of each of the plurality of endpoint devices based on a data collection profile, and wherein the data collection profile (DCP) includes a configured plurality of domains that are monitored for triggering automatic data collection using one of the plurality of endpoint agents when a user visits one or more of configured plurality of domains using a browser executed on one of the plurality of endpoint devices, and wherein the DCP includes a frequency for performing the periodic network measurements; and generating an alert or a report based on the test results.

28. The computer program product recited in claim 27, wherein the test results are collected in one or more of the following ways: user triggered, periodic network access and system data; and/or scheduled tests.

* * * * *